US012738024B2

(12) United States Patent
Huang et al.

(10) Patent No.: US 12,738,024 B2
(45) Date of Patent: Sep. 15, 2026

(54) METHOD AND APPARATUS FOR TRAINING IMAGE CLASSIFICATION MODEL, AND DEVICE

(71) Applicant: TENCENT TECHNOLOGY (SHENZHEN) COMPANY LIMITED, Shenzhen (CN)

(72) Inventors: Yawen Huang, Shenzhen (CN); Ziyun Cai, Shenzhen (CN); Dandan Zhang, Shenzhen (CN); Yuexiang Li, Shenzhen (CN); Hong Wang, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 248 days.

(21) Appl. No.: 18/752,567

(22) Filed: Jun. 24, 2024

(65) Prior Publication Data

US 2024/0355110 A1 Oct. 24, 2024

Related U.S. Application Data

(63) Continuation of application No. PCT/CN2023/116618, filed on Sep. 1, 2023.

(30) Foreign Application Priority Data

Sep. 30, 2022 (CN) ......................... 202211210860.9

(51) Int. Cl.
*G06V 10/82* (2022.01)
*G06T 11/60* (2026.01)
(Continued)

(52) U.S. Cl.
CPC .............. *G06V 10/82* (2022.01); *G06T 11/60* (2013.01); *G06V 10/44* (2022.01); *G06V 10/764* (2022.01)

(58) Field of Classification Search
CPC ...... G06F 16/75; G06V 10/774; G06V 10/82; G06V 10/44; G06V 10/764;
(Continued)

(56) References Cited

FOREIGN PATENT DOCUMENTS

| | | |
|---|---|---|
| CN | 113191478 A | 7/2021 |
| CN | 114445670 A | 5/2022 |

(Continued)

OTHER PUBLICATIONS

Xu, R., Chen, Z., Zuo, W., Yan, J., & Lin, L. (2018). Deep cocktail network: Multi-source unsupervised domain adaptation with category shift. In Proceedings of the IEEE conference on computer vision and pattern recognition (pp. 3964-3973). (Year: 2018).*

(Continued)

*Primary Examiner* — Utpal D Shah
*Assistant Examiner* — Jack Peter Kraynak
(74) *Attorney, Agent, or Firm* — Anova Law Group, PLLC

(57) ABSTRACT

A method for training an image classification model performed by an electronic device and includes: obtaining a plurality of sample source-domain images, a plurality of sample target-domain images, modal tagging results of the sample source-domain images, and category tagging results of the sample source-domain images; determining first category prediction results of the sample source-domain images by using a neural network model; determining first category prediction results of the sample target-domain images by using the neural network model; for a category tagging result, determining a first loss of the category tagging result based on source-domain image feature pairs corresponding to the category tagging result; and training the neural network model based on first losses of category tagging results, the first category prediction results of the sample source-domain images, and the first category prediction (Continued)

results of the sample target-domain images, to obtain an image classification model.

20 Claims, 5 Drawing Sheets

(51) Int. Cl.
*G06V 10/44* (2022.01)
*G06V 10/764* (2022.01)

(58) Field of Classification Search
CPC . G06T 2207/20084; G06T 2207/20081; G06T 11/60
See application file for complete search history.

(56) References Cited

FOREIGN PATENT DOCUMENTS

| | | |
|---|---|---|
| CN | 114445679 A | 5/2022 |
| CN | 114821282 A | 7/2022 |

OTHER PUBLICATIONS

Yin, Y., Yang, Z., Hu, H., & Wu, X. (2022). Universal multi-source domain adaptation for image classification. Pattern Recognition, 121, 108238. (Year: 2022).*
Saito K., Kim D., Sclaroff S., Saenko K. Universal domain adaptation through self supervision, Advances in Neural Information Processing Systems, vol. 33 (2020), p. 16282-16292 (Year: 2020).*
Q. Yu, A. Hashimoto, Y. Ushiku, Divergence Optimization for Noisy Universal Domain Adaptation, in: IEEE/CVF Conference on Computer Vision and Pattern Recognition, 2021, pp. 2515-2524. (Year: 2021).*
Z. Cai, J. Song, T. Zhang, X. Jing, L. Shao, Dual Contrastive Universal Adaptation Network, in: IEEE International Conference on Multimedia and Expo 2021, Shenzhen, China, Jul. 5-9, 2021, pp. 1-6. (Year: 2021).*
B. Fu, Z. Cao, M. Long, J. Wang, Learning to Detect Open Classes for Universal Domain Adaptation, in: European Conference on Computer Vision, 2020. (Year: 2020).*
Hoffman, J., Tzeng, E., Park, T., Zhu, J. Y., Isola, P., Saenko, K., ... & Darrell, T. (2018, July). Cycada: Cycle-consistent adversarial domain adaptation. In International conference on machine learning (pp. 1989-1998). Pmlr. (Year: 2018).*
G. Li, G. Kang, Y. Zhu, Y. Wei, Y. Yang, Domain Consensus Clustering for Universal Domain Adaptation, in: IEEE/CVF Conference on Computer Vision and Pattern Recognition, 2021, pp. 9757-9766. (Year: 2021).*
Y. Li, L. Yuan, Y. Chen, p. Wang, N. Vasconcelos, Dynamic Transfer for Multi-Source Domain Adaptation, in: IEEE/CVF Conference on Computer Vision and Pattern Recognition, 2021, p. 10998-11007. (Year: 2021).*
Ma, X., Gao, J., & Xu, C. (2021). Active universal domain adaptation. In Proceedings of the IEEE/CVF international conference on computer vision (pp. 8968-8977). (Year: 2021).*
The World Intellectual Property Organization (WIPO) International Search Report for PCT/CN2023/116618 Nov. 18, 2023 5 Pages (including translation).
"Attention Cycle-consistent universal network for More Universal Domain Adaptation." Anonymous ECCV submission, Paper ID 7871.
Silvia Bucci et al. "Distance-based hyperspherical classification for multi-source open-set domain adaptation." Proceedings of the IEEE/CVF Winter Conference on Applications of Computer Vision. 2022.
Silvia Bucci et al., "On the effectiveness of image rotation for open set domain adaptation." European conference on computer vision. Cham: Springer International Publishing, 2020.
Ziyun Cai et al. "Dual contrastive universal adaptation network." 2021 IEEE International Conference on Multimedia and Expo (ICME). IEEE, 2021.
Zhangjie Cao et al. "Partial transfer learning with selective adversarial networks." Proceedings of the IEEE conference on computer vision and pattern recognition. 2018.
Zhangjie Cao et al. "Learning to transfer examples for partial domain adaptation." Proceedings of the IEEE/CVF conference on computer vision and pattern recognition. 2019.
Bo Fu et al. "Learning to detect open classes for universal domain adaptation." Computer Vision—ECCV 2020: 16th European Conference, Glasgow, UK, Aug. 23-28, 2020, Proceedings, Part XV 16. Springer International Publishing, 2020.
Yaroslav Ganin et al. "Domain-adversarial training of neural networks." Journal of machine learning research 17.59 (2016): 1-35.
Greg Griffin et al., "Caltech-256 object category dataset", (2007).
Kaiming He et al. "Deep residual learning for image recognition." Proceedings of the IEEE conference on computer vision and pattern recognition. 2016.
Judy Hoffman et al. "Cycada: Cycle-consistent adversarial domain adaptation." International conference on machine learning. Pmlr, 2018.
Ying Jin et al. "Minimum class confusion for versatile domain adaptation." Computer Vision—ECCV 2020: 16th European Conference, Glasgow, UK, Aug. 23-28, 2020, Proceedings, Part XXI 16. Springer International Publishing, 2020.
Guangrui Li et al. "Domain consensus clustering for universal domain adaptation." Proceedings of the IEEE/CVF conference on computer vision and pattern recognition. 2021.
Yunsheng Li et al. "Dynamic transfer for multi-source domain adaptation." Proceedings of the IEEE/CVF Conference on Computer Vision and Pattern Recognition. 2021.
Jian Liang et al. "A balanced and uncertainty-aware approach for partial domain adaptation." European conference on computer vision. Cham: Springer International Publishing, 2020.
Hong Liu et al. "Separate to adapt: Open set domain adaptation via progressive separation." Proceedings of the IEEE/CVF conference on computer vision and pattern recognition. 2019.
Mingsheng Long et al. "Learning transferable features with deep adaptation networks." International conference on machine learning. PMLR, 2015.
Xinhong Ma et al., "Active universal domain adaptation". In: IEEE/CVF International Conference on Computer Vision. pp. 8968-8977 (2021).
S.J.Pan et al., "A survey on transfer learning", IEEE Transactions on Knowledge and Data Engineering 22(10), 1345-1359 (2010).
Mngwei Pan et al. "Exploring category-agnostic clusters for open-set domain adaptation." Proceedings of the IEEE/CVF conference on computer vision and pattern recognition. 2020.
Pau Panareda Busto et al., "Open set domain adaptation", In: IEEE International Conference on Computer Vision. pp. 754-763 (2017).
Geon Yeong Park et al., "Information-theoretic regularization for multi-source domain adaptation." Proceedings of the IEEE/CVF International Conference on Computer Vision. 2021.
Xingchao Peng et al. "Moment matching for multi-source domain adaptation." Proceedings of the IEEE/CVF international conference on computer vision. 2019.
Xingchao Peng et al. "Visda: A synthetic-to-real benchmark for visual domain adaptation." Proceedings of the IEEE Conference on Computer Vision and Pattern Recognition Workshops. 2018.
Sayan Rakshit et al. "Multi-source open-set deep adversarial domain adaptation." Computer Vision—ECCV 2020: 16th European Conference, Glasgow, UK, Aug. 23-28, 2020, Proceedings, Part XXVI 16. Springer International Publishing, 2020.
Olga Russakovsky et al. "Imagenet large scale visual recognition challenge." International journal of computer vision 115 (2015): 211-252.
Kate Saenko et al. "Adapting visual category models to new domains." Computer Vision—ECCV 2010: 11th European Conference on Computer Vision, Heraklion, Crete, Greece, Sep. 5-11, 2010, Proceedings, Part IV 11. Springer Berlin Heidelberg, 2010.

(56) References Cited

OTHER PUBLICATIONS

Kuniaki Saito et al. “Universal domain adaptation through self supervision.” Advances in neural information processing systems 33 (2020): 16282-16292.
Kuniaki Saito et al., “Ovanet: One-vs-all network for universal domain adaptation.” Proceedings of the ieee/cvf international conference on computer vision. 2021.
Kuniaki Saito et al. “Open set domain adaptation by backpropagation.” Proceedings of the European conference on computer vision (ECCV). 2018.
Hao Tang et al. “Attentiongan: Unpaired image-to-image translation using attention-guided generative adversarial networks.” IEEE transactions on neural networks and learning systems 34.4 (2021): 1972-1987.
Eric Tzeng et al. “Adversarial discriminative domain adaptation.” Proceedings of the IEEE conference on computer vision and pattern recognition. 2017.
Hemanth Venkateswara et al. “Deep hashing network for unsupervised domain adaptation.” Proceedings of the IEEE conference on computer vision and pattern recognition. 2017.
Ruijia Xu et al. “Deep cocktail network: Multi-source unsupervised domain adaptation with category shift.” Proceedings of the IEEE conference on computer vision and pattern recognition. 2018.
Ruijia Xu et al. “Larger norm more transferable: An adaptive feature norm approach for unsupervised domain adaptation.” Proceedings of the IEEE/CVF international conference on computer vision. 2019.
Kaichao You et al., “Universal domain adaptation”, In: IEEE Conference on Computer Vision and Pattern Recognition. pp. 2720-2729(2019).
Qing Yu et al., “Divergence optimization for noisy universal domain adaptation.” Proceedings of the IEEE/CVF conference on computer vision and pattern recognition. 2021.
Jing Zhang et al. “Importance weighted adversarial nets for partial domain adaptation.” Proceedings of the IEEE conference on computer vision and pattern recognition. 2018.
Sicheng Zhao et al. “Curriculum cyclegan for textual sentiment domain adaptation with multiple sources.” Proceedings of the Web Conference 2021. 2021.
Jun-Yan Zhu et al. “Unpaired image-to-image translation using cycle-consistent adversarial networks.” Proceedings of the IEEE international conference on computer vision. 2017.

* cited by examiner

Sample source-domain image and sample target-domain image
Feature extractor
Image feature
First generator
Second generator
First category classifier
Second category classifier
Discriminator
Weight coefficient of the sample target-domain image
Weight coefficient of the sample target-domain image
Modal classifier
Domain classifier
Weight coefficient of the sample source-domain image (1)

Sample target-domain image
Feature extractor
First category classifier
Discriminator
First category prediction result
Weight coefficient of the sample target-domain image
Is the weight coefficient less than a weight threshold?
No
Common category
Yes
Target-domain private category (2)

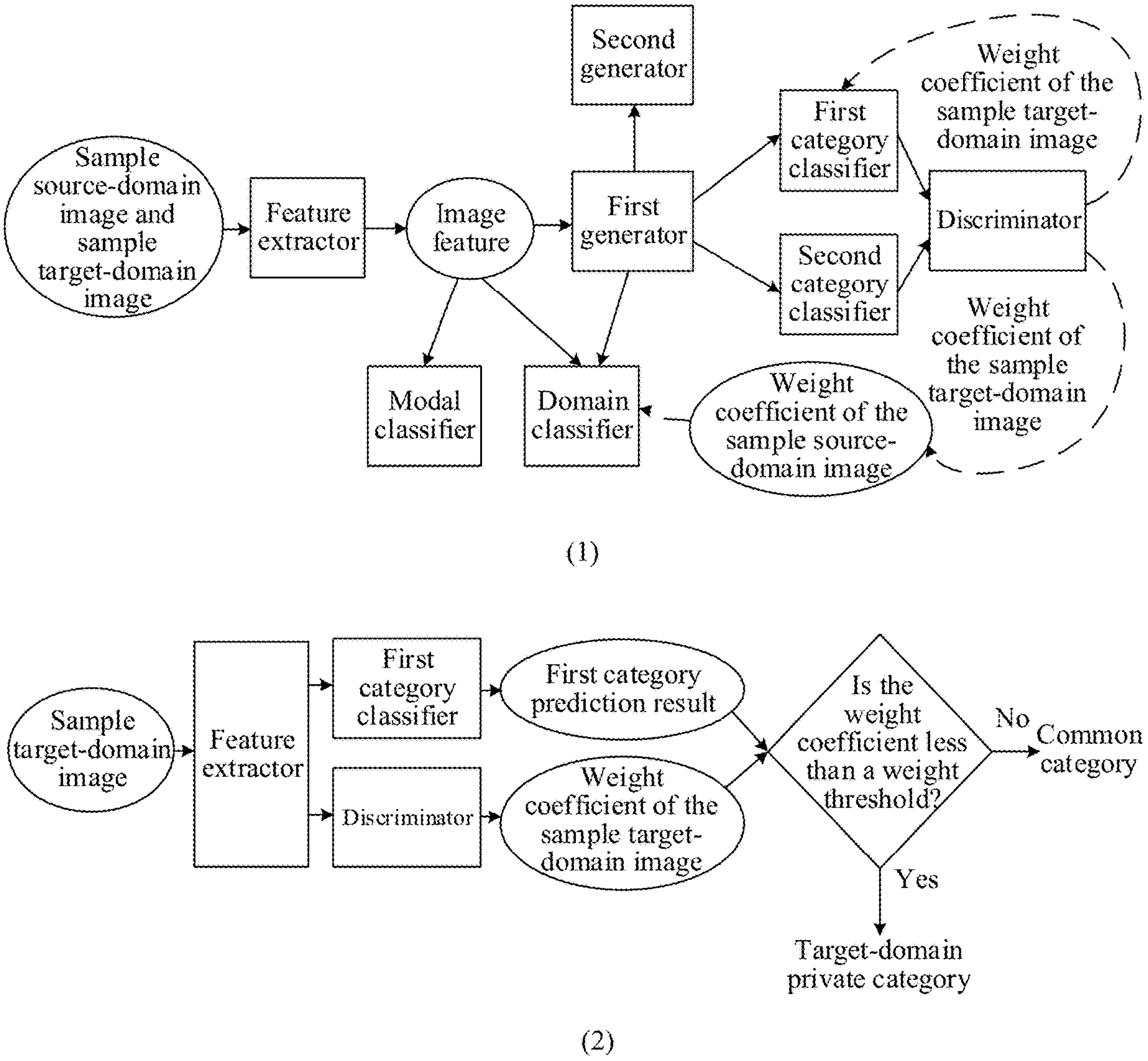

FIG. 5

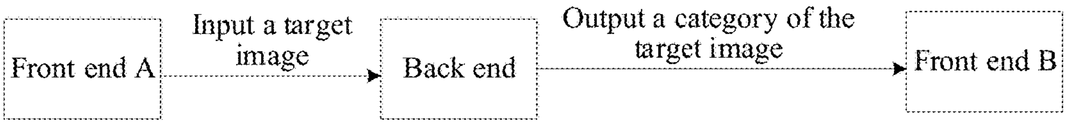

FIG. 6

METHOD AND APPARATUS FOR TRAINING IMAGE CLASSIFICATION MODEL, AND DEVICE

CROSS-REFERENCES TO RELATED APPLICATIONS

This application is a continuation application of PCT Patent Application No. PCT/CN2023/116618, which claims priority to Chinese Patent Application No. 202211210860.9, entitled "METHOD AND APPARATUS FOR TRAINING IMAGE CLASSIFICATION MODEL, AND DEVICE" filed on Sep. 30, 2022, both of which are incorporated herein by reference in their entirety.

FIELD OF THE TECHNOLOGY

Embodiments of the present disclosure relate to the field of computer technologies, and in particular, to a method and an apparatus for training an image classification model, and a device.

BACKGROUND OF THE DISCLOSURE

With continuous development of computer technologies, image classification technologies are widely used in various industries. An image classification model may be trained, so that the image classification model can be used for image classification.

SUMMARY

The present disclosure provides a method and an apparatus for training an image classification model, and a device. The technical solutions include the following content:

According to an aspect, a method for training an image classification model is provided. The method includes: obtaining a plurality of sample source-domain images, a plurality of sample target-domain images, modal tagging results of the sample source-domain images, and category tagging results of the sample source-domain images; determining first category prediction results of the sample source-domain images by using a neural network model; determining first category prediction results of the sample target-domain images by using the neural network model; for a category tagging result from the category tagging results of the sample source-domain images, determining a first loss of the category tagging result based on source-domain image feature pairs corresponding to the category tagging result, a source-domain image feature pair corresponding to the category tagging result including image features of two sample source-domain images, the two sample source-domain images having the category tagging result, and modal tagging results of the two sample source-domain images being different; and training the neural network model based on first losses of category tagging results, the first category prediction results of the sample source-domain images, and the first category prediction results of the sample target-domain images, to obtain an image classification model.

According to another aspect, an apparatus for training an image classification model is provided. The apparatus includes: an obtaining module, configured to obtain a plurality of sample source-domain images, a plurality of sample target-domain images, modal tagging results of the sample source-domain images, and category tagging results of the sample source-domain images; a determining module, configured to determine first category prediction results of the sample source-domain images by using a neural network model, the determining module being further configured to determine first category prediction results of the sample target-domain images by using the neural network model; and the determining module being further configured to: for a category tagging result, determine a first loss of the category tagging result based on source-domain image feature pairs of the category tagging result, a source-domain image feature pair corresponding to the category tagging result including image features of two sample source-domain images, the two sample source-domain images having the category tagging result, and modal tagging results of the two sample source-domain images being different; and a training module, configured to train the neural network model based on first losses of category tagging results, the first category prediction results of the sample source-domain images, and the first category prediction results of the sample target-domain images, to obtain an image classification model.

According to another aspect, an electronic device is provided. The electronic device includes a processor and a memory. The memory stores at least one computer program. The at least one computer program is loaded and executed by the processor, so that the electronic device implements the method for training an image classification model according to any one of the foregoing aspects.

According to another aspect, a non-transitory computer-readable storage medium is provided. The computer-readable storage medium stores at least one computer program. The at least one computer program is loaded and executed by a processor, so that an electronic device implements the method for training an image classification model according to any one of the foregoing aspects.

The technical solutions provided in the present disclosure have at least the following beneficial effect:

In the technical solutions provided in the present disclosure, for a category tagging result, image features of two sample source-domain images with a same category tagging result and different modal tagging results are used as a source-domain image feature pair corresponding to the category tagging result. This facilitates comparison between the image features of the two sample source-domain images with the same category tagging result and different modal tagging results. A first loss of the category tagging result is determined by using source-domain image feature pairs corresponding to the category tagging result, to obtain an image classification model through training by using the first loss of the category tagging result. In this way, the image classification model can draw image features of every two sample source-domain images with a same category tagging result and different modal tagging results close, so that the sample source-domain images with the same category tagging result and different modal tagging results have similar image features, and the image features focus more on category distinguishing and weaken modal distinguishing. Therefore, image features extracted by the image classification model are more conducive to image classification, so that accuracy of a classification result is improved.

BRIEF DESCRIPTION OF THE DRAWINGS

FIG. 5 is a schematic diagram of a process of training an image classification model according to an embodiment of the present disclosure.

FIG. 6 is a schematic diagram of image classification according to an embodiment of the present disclosure.

DESCRIPTION OF EMBODIMENTS

To make objectives, technical solutions, and advantages of the present disclosure clearer, the following further describes implementations of the present disclosure in detail with reference to accompanying drawings.

Figure 1:
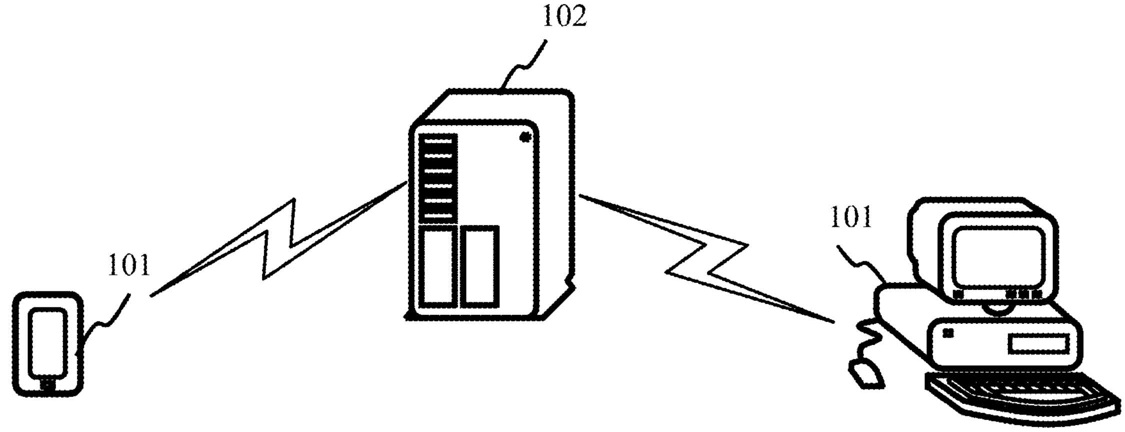
FIG. 1 is a schematic diagram of an implementation environment of a method for training an image classification model or an image classification method according to an embodiment of the present disclosure.

FIG. 1 is a schematic diagram of an implementation environment of a method for training an image classification model or an image classification method according to an embodiment of the present disclosure. As shown in FIG. 1, the implementation environment includes a terminal device 101 and a server 102. The method for training an image classification model or the image classification method in embodiments of the present disclosure may be performed by the terminal device 101, the server 102, or both the terminal device 101 and the server 102.

The terminal device 101 may be a smartphone, a game console, a desktop computer, a tablet computer, a laptop portable computer, a smart television, a smart in-vehicle device, a smart voice interaction device, a smart home appliance, or the like. The server 102 may be one server, a server cluster including a plurality of servers, or either of a cloud computing platform and a virtualization center. This is not limited in embodiments of the present disclosure. The server 102 may communicate with the terminal device 101 through a wired or wireless network. The server 102 may have functions of data processing, data storage, data transmitting and receiving, and the like. This is not limited in embodiments of the present disclosure. A quantity of terminal devices 101 and a quantity of servers 102 are not limited, and one or more terminal devices 101 and servers 102 may exist.

The method for training an image classification model or the image classification method provided in embodiments of the present disclosure may be implemented based on an artificial intelligence (AI) technology. AI involves a theory, a method, a technology, and an application system that use a digital computer or a machine controlled by a digital computer to simulate, extend, and expand human intelligence, perceive an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, to enable the machines to have functions of perception, reasoning, and decision-making.

The AI technology is a comprehensive discipline, and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, machine learning/deep learning, autonomous driving, and intelligent traffic.

An image classification technology is a quite important technology, and may be used in various industries. Usually, a trained image classification model is configured to classify images.

In some cases, during training of an image classification model, a sample source-domain image, a sample target-domain image, and a category tagging result of the sample source-domain image may be obtained. The sample source-domain image and the sample target-domain image are input to a neural network model. The neural network model determines a category prediction result of the sample source-domain image and a category prediction result of the sample target-domain image. The neural network model is trained based on the category prediction result and the category tagging result of the sample source-domain image and the category prediction result of the sample target-domain image, to obtain an image classification model. However, classification effect of the image classification model obtained through training in the foregoing manner is poor. This affects accuracy of an image classification result.

The source domain and the target domain are terms of transfer learning. The transfer learning is to learn new knowledge by using existing knowledge, to find a similarity between the existing knowledge and the new knowledge. In the transfer learning, the existing knowledge belongs to the source domain, and the new knowledge to be learned belongs to the target domain. The source domain and the target domain are different but are associated to some extent. A distribution difference between the source domain and the target domain needs to be reduced to transfer knowledge and calibrate data. The method for training an image classification model provided in embodiments of the present disclosure is content of the transfer learning.

Figure 2:
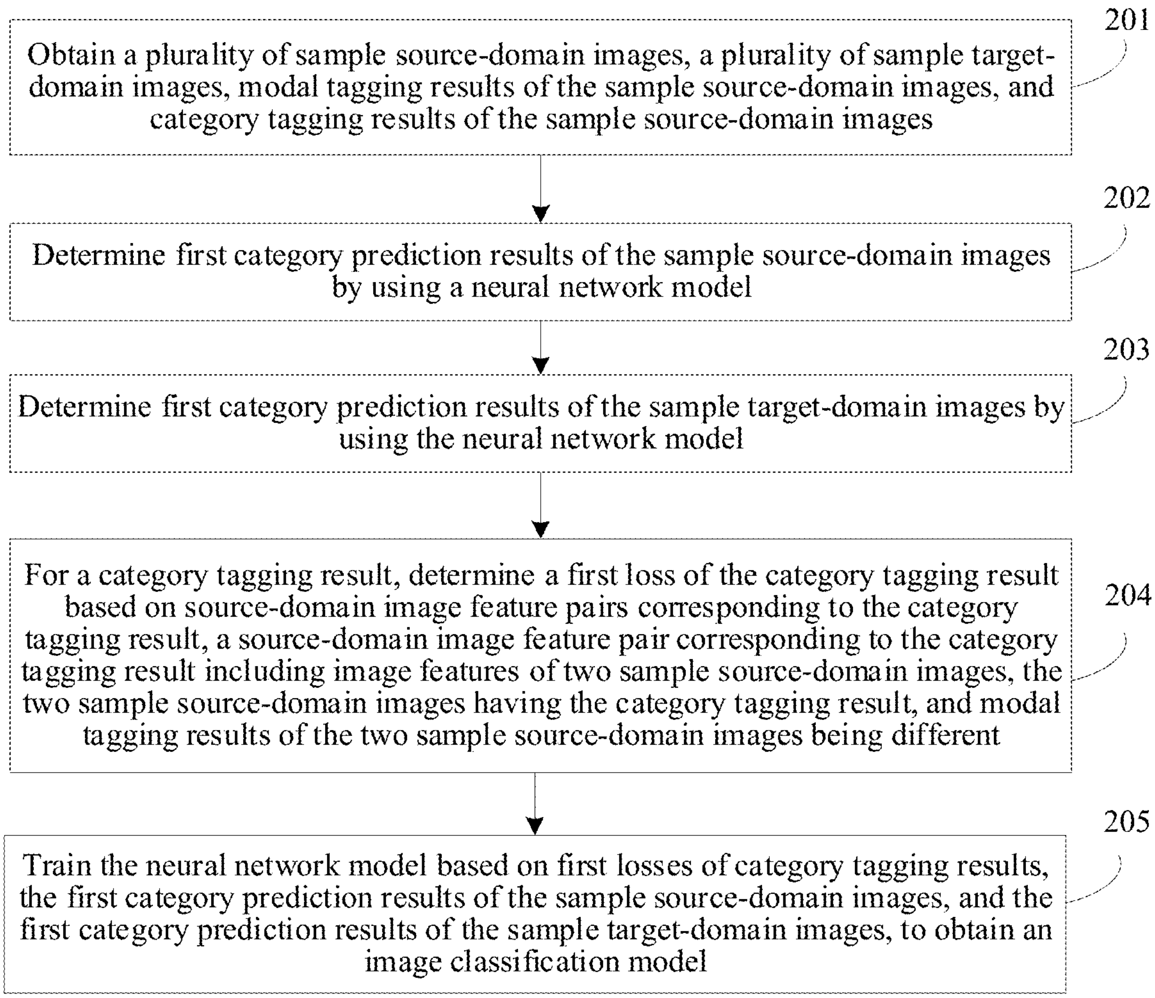
FIG. 2 is a flowchart of a method for training an image classification model according to an embodiment of the present disclosure.

Embodiments of the present disclosure provide a method for training an image classification model. The method may be applied to the foregoing implementation environment. An image classification model obtained through training by using the method can improve accuracy of classification. A flowchart of a method for training an image classification model according to an embodiment of the present disclosure in FIG. 2 is used as an example. The method may be performed by the terminal device 101 or the server 102 in FIG. 1, or may be performed by both the terminal device 101 and the server 102. For ease of description, the terminal device 101 or the server 102 for performing the method for training an image classification model in embodiments of the present disclosure is referred to as an electronic device.

The method may be performed by the electronic device. As shown in FIG. 2, the method includes the following operations:

Operation 201: Obtain a plurality of sample source-domain images, a plurality of sample target-domain images, modal tagging results of the sample source-domain images, and category tagging results of the sample source-domain images.

The sample source-domain image is an image in a source domain, and the sample target-domain image is an image in a target domain. The source domain and the target domain are two different domains. The source domain and the target domain are not limited in embodiments of the present disclosure. For example, the source domain is a painting domain, and the target domain is a reality domain. The electronic device may obtain the plurality of sample source-domain images and the plurality of sample target-domain images through manual input, capturing from a network, or the like.

One sample source-domain image corresponds to one modality, and modalities of any two sample source-domain images may be the same or different. In embodiments of the present disclosure, a modality represents an image style of an image in a specific domain, and the modality is not limited in embodiments of the present disclosure. For example, the source domain is the painting domain. In this case, the modality of the sample source-domain image includes any one of the following modalities: oil painting, watercolor painting, sketch, and the like. Modal tagging may be performed on any sample source-domain image to obtain a modal tagging result of the sample source-domain image. The modal tagging result of the sample source-domain image may be understood as a modal tag of the sample source-domain image, and indicates a modality of an image style to which the sample source-domain image belongs. A modal tagging manner is not limited in embodiments of the present disclosure. For example, modal tagging is performed on the sample source-domain image through a modal classification model or manual tagging to obtain the modal tagging result of the sample source-domain image.

One sample source-domain image corresponds to one category, and categories of any two sample source-domain images may be the same or different. In embodiments of the present disclosure, a category may indicate image content, and the category is not limited in embodiments of the present disclosure. For example, the category of the sample source-domain image includes an animal, a building, a vehicle, or the like. The electronic device may perform category tagging on any sample source-domain image to obtain a category tagging result of the sample source-domain image. The category tagging result of the sample source-domain image may be understood as a category tag of the sample source-domain image, and indicates a category of image content to which the sample source-domain image belongs. A category tagging manner is not limited in embodiments of the present disclosure. For example, category tagging is performed on the sample source-domain image through an image classification model or manual tagging.

Therefore, in embodiments of the present disclosure, the modal tagging result is obtained by performing modal tagging on the sample source-domain image, and the modality of the sample source-domain image indicates the image style of the sample source-domain image; and the category tagging result is obtained by performing category tagging on the sample source-domain image, and the category of the sample source-domain image indicates the image content of the sample source-domain image.

Operation 202: Determine first category prediction results of the sample source-domain images by using a neural network model.

The electronic device inputs any sample source-domain image to the neural network model. The neural network model performs category classification on the sample source-domain image to obtain a first category prediction result of the sample source-domain image. Each sample source-domain image corresponds to a category tagging result, and category tagging results of any two sample source-domain images may be the same or different. Therefore, a plurality of category tagging results exist. In embodiments of the present disclosure, the first category prediction result of the sample source-domain image includes probabilities that the sample source-domain image belongs to the categories corresponding to (indicated by) the category tagging results. Hereinafter, an image belonging to a category corresponding to a category tagging result may be simply referred to as the image belonging to the category tagging result.

A model structure, a size, and the like of the neural network model are not limited in embodiments of the present disclosure. For example, the neural network model includes a feature extractor and a first category classifier. The feature extractor is configured to perform feature extraction on the sample source-domain images. The first category classifier is configured to perform category classification on the sample source-domain images.

In some embodiments, the electronic device inputs any sample source-domain image to the neural network model, and the feature extractor in the neural network model performs feature extraction on the sample source-domain image to obtain an image feature of the sample source-domain image. For example, the feature extractor includes at least one convolutional block sequentially connected in series. The sample source-domain image may be considered as an input feature for the first convolutional block, and the image feature of the sample source-domain image may be considered as an output feature of the last convolutional block.

Any convolutional block includes a convolutional neural network (CNN). The CNN performs convolutional processing on an input feature for the convolutional block to reduce a feature dimensionality of the input feature. Network layers such as a pooling layer and an activation layer may be concatenated after the CNN. The pooling layer is configured to pool an input feature for the pooling layer. The activation layer is configured to activate an input feature for the activation layer.

In one embodiment, operation 202 includes operation 2021 and operation 2022.

Operation 2021: For any sample source-domain image, generate, based on an image feature of the sample source-domain image by using the neural network model, a first target-domain image corresponding to the sample source-domain image.

In embodiments of the present disclosure, the neural network model includes a feature extractor, a first generator, and a first category classifier. The first generator is connected in series after the feature extractor. The first category classifier is connected in series after the first generator.

The first generator is a generator with a built-in attention mechanism. The generator may learn a mapping relationship between a source-domain image and a target-domain image. After the feature extractor extracts an image feature of any sample source-domain image, the first generator maps, based on the image feature of the sample source-domain image, the sample source-domain image to a first target-domain image corresponding to the sample source-domain image.

The first target-domain image corresponding to the sample source-domain image is a target-domain image generated based on the image feature of the sample source-domain image. The sample source-domain image is an image in the source domain, and the first target-domain image corresponding to the sample source-domain image is an image in the target domain. Therefore, the sample source-domain image and the first target-domain image corresponding to the sample source-domain image belong to different domains.

In some embodiments, operation 2021 includes: generating a target-domain feature and an image content feature of the sample source-domain image based on the image feature of the sample source-domain image; and generating, based on the target-domain feature and the image content feature of the sample source-domain image, the first target-domain image corresponding to the sample source-domain image.

The first generator may split an image feature of any sample source-domain image into a source-domain feature of the sample source-domain image and an image content feature of the sample source-domain image. The source-domain feature of the sample source-domain image represents a common characteristic of source-domain images. For example, the source domain is the painting domain, and most images in the painting domain have no realistic textures and have a strong sense of lines. Therefore, the source-domain feature of the sample source-domain image can indicate lines and textures of the source-domain images. The image content feature of the sample source-domain image represents image content of the sample source-domain image, and focuses more on describing an object in the sample source-domain image. For example, if the sample source-domain image is a facial image, the image content feature of the sample source-domain image can indicate facial information, such as eyes, a nose, a mouth, and eyebrows, of the sample source-domain image, and focuses more on describing a face.

Because the first generator learns the mapping relationship between a source-domain image and a target-domain image, the first generator may map the source-domain feature of the sample source-domain image to a target-domain feature of the sample source-domain image based on the mapping relationship. The target-domain feature of the sample source-domain image represents a common characteristic of target-domain images. For example, the target domain is the reality domain, and most images in the reality domain have realistic textures and have a weak sense of lines. Therefore, the target-domain feature corresponding to the sample source-domain image can indicate lines and textures of the target-domain images.

Then the first generator fuses a target-domain feature of any sample source-domain image with an image content feature of the sample source-domain image, to fuse image content of the sample source-domain image with the common characteristic of the target-domain images to obtain an image feature of a first target-domain image corresponding to the sample source-domain image. Therefore, the first target-domain image corresponding to the sample source-domain image is generated based on the image feature of the first target-domain image.

For example, a process of generating the first target-domain image corresponding to the sample source-domain image may be expressed as follows:

$$x \to [A, C] \to G^{A}_{s \to t}(x),$$

where x represents the sample source-domain image, A represents the target-domain feature of the sample source-domain image, C represents the image content feature of the sample source-domain image, and $$G^{A}_{s \to t}(x)$$

represents the first target-domain image corresponding to the sample source-domain image.

$$G^{A}_{s \to t}$$

represents the first generator. The first generator is a generator based on an attention mechanism, and may convert a source-domain image into a target-domain image.

In some embodiments, the first generator multiplies the target-domain feature of the sample source-domain image by the image content feature of the sample source-domain image to obtain a first product result, multiplies the image feature of the sample source-domain image by the target-domain feature of the sample source-domain image to obtain a second product result, adds the first product result to the image feature of the sample source-domain image, and subtracts the second product result from an addition result to obtain the image feature of the first target-domain image corresponding to the sample source-domain image, to determine the first target-domain image corresponding to the sample source-domain image. In this way, image content of the first target-domain image corresponding to the sample source-domain image can be closer to that of the sample source-domain image, so that a difference between the sample source-domain image and the first target-domain image corresponding to the sample source-domain image can be controlled to be at a domain level.

For example, the first target-domain image corresponding to the sample source-domain image may be expressed as follows:

$$G^{A}_{s \to t}(x) = C^{s \to t} * A^{s \to t} + x * (1 - A^{s \to t}),$$

where $$G^{A}_{s \to t}(x)$$

represents the first target-domain image corresponding to the sample source-domain image, $C^{s \to t}$ represents the image content feature of the sample source-domain image, $A^{s \to t}$ represents the target-domain feature of the sample source-domain image, and x represents the sample source-domain image. The first generator may extract the image feature of the sample source-domain image, or may determine the first target-domain image corresponding to the sample source-domain image based on the image feature of the first target-domain image corresponding to the sample source-domain image. Therefore, a process of extracting the image feature and a process of generating an image based on the image feature are omitted herein.

Operation 2022: Determine the first category prediction result of the sample source-domain image based on the first target-domain image corresponding to the sample source-domain image by using the neural network model.

In embodiments of the present disclosure, the first category classifier is connected in series after the first generator. The electronic device uses the first target-domain image that corresponds to the sample source-domain image and that is generated by the first generator or the image feature of the first target-domain image as input information for the first category classifier. The first category classifier performs category classification on the first target-domain image based on the input information to obtain a first category prediction result. The first category prediction result is used as the first category prediction result of the sample source-domain image. A model structure, a model size, and the like of the first category classifier are not limited in embodiments of the present disclosure.

Operation 203: Determine first category prediction results of the sample target-domain images by using the neural network model.

The electronic device inputs a sample target-domain image to the neural network model. The neural network model performs category classification on the sample target-domain image to obtain a first category prediction result of the sample target-domain image. The first category prediction result of the sample target-domain image includes probabilities that the sample target-domain image belongs to the category tagging results.

A model structure, a size, and the like of the neural network model are not limited in embodiments of the present disclosure. For example, the neural network model includes a feature extractor and a first category classifier. The feature extractor is configured to perform feature extraction on the sample target-domain images. The first category classifier is configured to perform category classification on the sample target-domain images.

In some embodiments, the electronic device inputs a sample target-domain image to the neural network model, and the feature extractor in the neural network model performs feature extraction on the sample target-domain image to obtain an image feature of the sample target-domain image. For example, the feature extractor includes at least one convolutional block sequentially connected in series. The sample target-domain image may be considered as an input feature for the first convolutional block, and the image feature of the sample target-domain image may be considered as an output feature of the last convolutional block.

In one embodiment, operation 203 includes operation 2031 and operation 2032.

Operation 2031: For a sample target-domain image, generate, based on an image feature of the sample target-domain image by using the neural network model, a first source-domain image corresponding to the sample target-domain image.

In embodiments of the present disclosure, the neural network model includes a feature extractor, a first generator, and a first category classifier. The first generator is connected in series after the feature extractor. The first category classifier is connected in series after the first generator.

The first generator learns a mapping relationship between a source-domain image and a target-domain image. After the feature extractor extracts the image feature of the sample target-domain image, the first generator maps, based on the image feature of the sample target-domain image, the sample target-domain image to the first source-domain image corresponding to the sample target-domain image.

The first source-domain image corresponding to the sample target-domain image is a source-domain image generated based on the image feature of the sample target-domain image. The sample target-domain image is an image in the target domain, and the first source-domain image corresponding to the sample target-domain image is an image in the source domain. Therefore, the sample target-domain image and the first source-domain image corresponding to the sample target-domain image belong to different domains.

In some embodiments, operation 2031 includes: generating, based on the image feature of the sample target-domain image, a source-domain feature and an image content feature that correspond to the sample target-domain image; and generating, based on the source-domain feature and the image content feature that correspond to the sample target-domain image, the first source-domain image corresponding to the sample target-domain image.

The first generator may split an image feature of a sample target-domain image into a target-domain feature of the sample target-domain image and an image content feature of the sample target-domain image. The target-domain feature of the sample target-domain image represents a common characteristic of target-domain images. The image content feature of the sample target-domain image represents image content of the sample target-domain image, and focuses more on describing an object in the sample target-domain image.

Because the first generator learns the mapping relationship between a source-domain image and a target-domain image, the first generator may map the target-domain feature of the sample target-domain image to a source-domain feature of the sample target-domain image based on the mapping relationship. The source-domain feature of the sample target-domain image represents a common characteristic of source-domain images.

Then the first generator may fuse a source-domain feature of any sample target-domain image with an image content feature of the sample target-domain image, to fuse image content of the sample target-domain image with the common characteristic of the source-domain images to obtain an image feature of a first source-domain image corresponding to the sample target-domain image. Therefore, the first source-domain image corresponding to the sample target-domain image is generated based on the image feature of the first source-domain image.

For example, a process of generating the first source-domain image corresponding to the sample target-domain image may be expressed as follows:

$$x \rightarrow [A, C] \rightarrow G^{A}_{t \rightarrow s}(x),$$

where x represents the sample target-domain image, A represents the source-domain feature of the sample target-domain image, C represents the image content feature of the sample target-domain image, and $$G^A_{t\to s}(x)$$

represents the first source-domain image corresponding to the sample target-domain image.

$$G^A_{t\to s}$$

represents the first generator. The first generator is a generator based on an attention mechanism, and may convert a target-domain image into a source-domain image.

In some embodiments, the first generator multiplies the source-domain feature of the sample target-domain image by the image content feature of the sample target-domain image to obtain a third product result, multiplies the image feature of the sample target-domain image by the source-domain feature of the sample target-domain image to obtain a fourth product result, adds the third product result to the image feature of the sample target-domain image, and subtracts the fourth product result from an addition result to obtain the image feature of the first source-domain image corresponding to the sample target-domain image, to determine the first source-domain image corresponding to the sample target-domain image. In this way, image content of the first source-domain image corresponding to the sample target-domain image can be closer to that of the sample target-domain image, so that a difference between the sample target-domain image and the first source-domain image corresponding to the sample target-domain image can be controlled to be at a domain level.

For example, the first source-domain image corresponding to the sample target-domain image may be expressed as follows:

$$G^A_{t\to s}(x) = C^{t\to s} * A^{t\to s} + x * (1 - A^{t\to s}),$$

where $$G^A_{t\to s}(x)$$

represents the first source-domain image corresponding to the sample target-domain image, $C^{t\to s}$ represents the image content feature of the sample target-domain image, $A^{t\to s}$ represents the source-domain feature of the sample target-domain image, and x represents the sample target-domain image. The first generator may extract the image feature of the sample target-domain image, or may determine the first source-domain image corresponding to the sample target-domain image based on the image feature of the first source-domain image corresponding to the sample target-domain image. Therefore, a process of extracting the image feature and a process of generating an image based on the image feature are omitted herein.

Operation 2032: Determine the first category prediction result of the sample target-domain image based on the first source-domain image corresponding to the sample target-domain image by using the neural network model.

In embodiments of the present disclosure, the first category classifier is connected in series after the first generator. The electronic device uses the first source-domain image that corresponds to the sample target-domain image and that is generated by the first generator or the image feature of the first source-domain image as input information for the first category classifier. The first category classifier performs category classification on the first source-domain image based on the input information to obtain a first category prediction result. The first category prediction result is used as the first category prediction result of the sample target-domain image.

Operation 204: For a category tagging result, determine a first loss of the category tagging result based on source-domain image feature pairs corresponding to the category tagging result, a source-domain image feature pair corresponding to the category tagging result including image features of two sample source-domain images, the two sample source-domain images having the category tagging result, and modal tagging results of the two sample source-domain images being different.

In embodiments of the present disclosure, any category tagging result corresponds to a plurality of sample source-domain images. For any two sample source-domain images with a category tagging result, if modal tagging results of the two sample source-domain images are different, image features of the two sample source-domain images are used as a source-domain image feature pair corresponding to the category tagging result. To be specific, the two sample source-domain images have a same category tagging result and different modal tagging results.

For a source-domain image feature pair corresponding to any category tagging result, the electronic device calculates a feature distance between image features of two sample source-domain images in the source-domain image feature pair. The feature distance may be a cosine distance, a Euclidean distance, a least square error (also referred to as an L2 norm), a square of an L2 norm, or the like. The feature distance may be simply denoted as a distance of the source-domain image feature pair.

For example, sample source-domain images corresponding to an $i^{th}$ category tagging result may be denoted as $$D_s^i = \{D_s^{1i}, \ldots, D_s^{mi}\},$$

where m represents a quantity of modal tagging results corresponding to the $i^{th}$ category tagging result. In this case, a category tagging result of a sample source-domain image $$D_s^{1i}$$

is the $i^{th}$ category tagging result, and a modal tagging result is the first modal tagging result; and a category tagging result of a sample source-domain image $$D_s^{mi}$$

is the $i^{th}$ category tagging result, and a modal tagging result is an $m^{th}$ modal tagging result.

Based on the foregoing information, a category tagging result of a sample source-domain image $$D_s^{ik}$$

is a k$^{th}$ category tagging result, a modal tagging result of the sample source-domain image $$D_s^{ik}$$

is an i$^{th}$ modal tagging result, a category tagging result of a sample source-domain image $$D_s^{jk}$$

is the k$^{th}$ category tagging result, and a modal tagging result of the sample source-domain image $$D_s^{jk}$$

is a j$^{th}$ modal tagging result. Therefore, an image feature $$F(D_s^{ik})$$

of the sample source-domain image $$D_s^{ik}$$

and an image feature $$F(D_s^{jk})$$

of the sample source-domain image $$D_s^{jk}$$

may be used as a source-domain image feature pair corresponding to the k$^{th}$ category tagging result. A distance of the source-domain image feature pair may be denoted as $$E\|F(D_s^{ik}) - F(D_s^{jk})\|_2^2,$$

and the distance of the source-domain image feature pair is a square of an L2 norm between $$F(D_s^{ik})$$

and $$F(D_s^{jk}).$$

A feature distance between image features of two sample source-domain images with a same category tagging result and different modal tagging results is calculated. In this way, a similarity between every two sample source-domain images with a same category tagging result and different modal tagging results can be maximized, domain migration between modalities can be achieved by using complementary knowledge of different modalities, to avoid negative migration. In addition, sample source-domain images with a same category tagging result and different modal tagging results have similar image features. This facilitates alignment between a source-domain image and a target-domain image, and facilitates subsequent processing such as modal classification and category classification.

The electronic device determines a first loss of any category tagging result based on distances of source-domain image feature pairs corresponding to the category tagging result. For example, calculation, such as averaging or summation, is performed on distances of source-domain image feature pairs corresponding to any category tagging result, and an obtained calculation result is used as a first loss of the category tagging result.

Operation 205: Train the neural network model based on first losses of category tagging results, the first category prediction results of the sample source-domain images, and the first category prediction results of the sample target-domain images, to obtain an image classification model.

The electronic device determines a multi-source modal alignment loss based on the first losses of the category tagging results. In some embodiments, the electronic device performs calculation, such as averaging or summation, on the first losses of the category tagging results, and an obtained calculation result is used as the multi-source modal alignment loss. For example, a formula for calculating the multi-source modal alignment loss is shown in the following formula (1).

$$L^1 = \frac{1}{K}\sum_{k \in Y_s} \frac{1}{m}\sum_{j,i=1,i\neq j}^{m} E\|F(D_s^{ik}) - F(D_s^{jk})\|_2^2 \qquad \text{Formula (1)}$$

$L^1$ represents the multi-source modal alignment loss. K represents a quantity of category tagging results. $Y_s$ represents a category tag set including the category tagging results. m represents a quantity of modal tagging results corresponding to a k$^{th}$ category tagging result. Σ is a summation sign.

$$E\|F(D_s^{ik}) - F(D_s^{jk})\|_2^2$$

represents a distance of a source-domain image feature pair corresponding to the k$^{th}$ category tagging result. This is correspondingly described above, and details are not described herein again.

In embodiments of the present disclosure, the first category prediction results of the sample source-domain images and the first category prediction results of the sample target-domain images are configured for determining a loss. A loss of the neural network model may be determined based on the determined loss and the multi-source modal alignment loss, and the neural network model is trained by using the loss of the neural network model to obtain a trained neural network model.

If the trained neural network model meets a training end condition, the trained neural network model is used as the image classification model. If the trained neural network model does not meet the training end condition, the trained neural network model is used as a neural network model for next training, and the next training is performed on the neural network model in the manner of operation 201 to operation 205, until the image classification model is obtained.

The training end condition is not limited in embodiments of the present disclosure. For example, the meeting the training end condition means that a quantity of times of training reaches a specified quantity of times. For example, the quantity of times of training is 500. Alternatively, the meeting the training end condition means that gradient descent of the loss of the neural network model falls within a specified range.

In embodiments of the present disclosure, the multi-source modal alignment loss is calculated based on distances of source-domain image feature pairs corresponding to the category tagging results. The neural network model is trained by using the multi-source modal alignment loss, so that the neural network model can shorten a distance of a source-domain image feature pair corresponding to a same category tagging result. In this way, sample source-domain images with modal tagging results corresponding to a same category tagging result have similar image features. In other words, sample source-domain images with a same category tagging result have similar image features. Therefore, image features extracted by the image classification model focus more on category distinguishing and weaken modal distinguishing, so that classification accuracy can be improved during image classification based on image features.

In one embodiment, operation 205 includes operation 2051 to operation 2053.

Operation 2051: Determine a second loss based on the first category prediction results of the sample source-domain images and the category tagging results of the sample source-domain images.

In embodiments of the present disclosure, a first category prediction result of any sample source-domain image includes probabilities that the sample source-domain image belongs to categories indicated by the category tagging results. A category tagging result of any sample source-domain image indicates that the sample source-domain image belongs to a specific category tagging result and does not belong to a category tagging result other than the specific category tagging result.

A quantity of category tagging results is denoted as N. In this case, a first category prediction result of any sample source-domain image is a matrix. The matrix is denoted as Y. In this case, the matrix Y includes N pieces of data. Each piece of data corresponds to a category tagging result. Any piece of data represents a probability that the sample source-domain image belongs to a category tagging result corresponding to the data. Each piece of data is a value greater than or equal to 0 and less than or equal to 1. A category tagging result of any sample source-domain image is also a matrix, and the matrix is denoted as P. In this case, the matrix P includes N pieces data. Each piece of data corresponds to a category tagging result. Any piece of data indicates that the sample source-domain image belongs to a category tagging result corresponding to the data or the sample source-domain image does not belong to a category tagging result corresponding to the data. Any piece of data is one of two values. For example, any piece of data in the matrix P may be 1, indicating that the sample source-domain image belongs to a category tagging result corresponding to the data; or any piece of data in the matrix P may be 0, indicating that the sample source-domain image does not belong to a category tagging result corresponding to the data.

In some embodiments, a source-domain image includes category tagging results, for example, the foregoing N category tagging results. In addition to at least one category tagging result, a target-domain image may further include other category tagging results. For example, in addition to at least one of the foregoing N category tagging results, the target-domain image may further include other category tagging results. For example, the source-domain image includes two category tagging results: apple and pear; and the target-domain image includes three category tagging results: apple, banana, and watermelon. Because the banana and the watermelon are category tagging results not included in the source-domain image, the banana and the watermelon may be considered as other category tagging results.

In embodiments of the present disclosure, category classification needs to be performed on a target-domain image, and the target-domain image may include other category tagging results. Therefore, for any sample source-domain image, the neural network model may determine probabilities that the sample source-domain image belongs to the category tagging results and probabilities that the sample source-domain image belongs to other category tagging results. This makes a transfer mechanism more reliable. The transfer mechanism herein is to transfer category classification for a source-domain image to category classification for a target-domain image.

In this case, assuming that a quantity of category tagging results is N, a matrix Y corresponding to a first category prediction result of any sample source-domain image includes N+1 pieces of data, and the first N pieces of data correspond to the N category tagging results in a one-to-one manner. Any one of the first N pieces of data represents a probability that the sample source-domain image belongs to a category tagging result corresponding to the data. The last piece of data represents a probability that the sample source-domain image belongs to an unknown category tagging result, namely, a probability that the sample source-domain image belongs to a category tagging result other than the N category tagging results. Similarly, a matrix P corresponding to a category tagging result of any sample source-domain image also includes N+1 pieces of data, and the first N pieces of data correspond to the N category tagging results in a one-to-one manner. Any one of the first N pieces of data indicates that the sample source-domain image belongs to a category tagging result corresponding to the data or the sample source-domain image does not belong to a category tagging result corresponding to the data. The last piece of data indicates that the sample source-domain image does not belong to an unknown category tagging result.

The last piece of data corresponding to the unknown category tagging result is only one embodiment. During application, any piece of data in the matrix Y and the matrix P may correspond to an unknown category.

In embodiments of the present disclosure, the second loss may be calculated based on a second loss function, the first category prediction results of the sample source-domain images, and the category tagging results of the sample source-domain images. In other words, the second loss may be calculated based on the matrix Y and the matrix P. The second loss function is not limited in embodiments of the present disclosure. For example, the second loss function is a cross entropy loss function or a relative entropy loss function.

Operation 2052: Determine a third loss based on the first category prediction results of the sample target-domain images.

In embodiments of the present disclosure, category tagging does not need to be performed on the sample target-domain images. Therefore, the sample target-domain images have no category tagging result. The third loss may be determined based on the first category prediction results of the sample target-domain images and other information. For example, the other information is at least one of image features of the sample target-domain images, image features of the sample source-domain images, and the like.

In one embodiment, operation 2052 includes operation A1 to operation A3.

Operation A1: Determine weight coefficients of the sample target-domain images based on the first category prediction results of the sample target-domain images.

In embodiments of the present disclosure, a first category prediction result of any sample target-domain image includes probabilities that the sample target-domain image belongs to the category tagging results. Therefore, data, such as a sum of probabilities or an average value of probabilities, may be determined based on the probabilities that the sample target-domain image belongs to the category tagging results, and the determined data may be used as a weight coefficient of the sample target-domain image.

In some embodiments, a first category prediction result of any sample target-domain image further includes probabilities that the sample target-domain image belongs to other category tagging results. The probabilities that the sample target-domain image belongs to the other category tagging results may be used as weight coefficients of the sample target-domain image, or a weight coefficient of the sample target-domain image may be calculated based on the probabilities that the sample target-domain image belongs to the category tagging results and the probabilities that the sample target-domain image belongs to the other category tagging results.

In some embodiments, a first category prediction result of any sample target-domain image includes a first probability of the sample target-domain image, and the first probability of the sample target-domain image is a probability that the sample target-domain image belongs to a category other than categories in the category tagging results (e.g., private category). In this case, operation A1 includes: obtaining second category prediction results of the sample target-domain images, a second category prediction result of any sample target-domain image including a second probability of the sample target-domain image, and the second probability of the sample target-domain image being a second probability that the sample target-domain image belongs to one of the categories in the category tagging results (e.g., public category); and for any sample target-domain image, determining a weight coefficient of the sample target-domain image based on a first probability and a second probability of the sample target-domain image.

In embodiments of the present disclosure, a category prediction result of any sample target-domain image includes a first category prediction result and a second category prediction result. The first category prediction result includes probabilities that the sample target-domain image belongs to other category tagging results, and the probabilities that the sample target-domain image belongs to other categories may be denoted as first probabilities of the sample target-domain image. The second category prediction result includes probabilities that the sample target-domain image belongs to the category tagging results, and the probabilities that the sample target-domain image belongs to the category tagging results may be denoted as second probabilities of the sample target-domain image.

In some embodiments, the neural network model further includes a second category classifier. The second category classifier is configured to perform category classification on the sample target-domain images to obtain the second category prediction results of the sample target-domain images. The second category classifier is connected in series after the first generator. A first source-domain image that corresponds to any sample target-domain image and that is generated by the first generator or an image feature of the first source-domain image is used as input information for the second category classifier. The second category classifier performs category classification on the first source-domain image based on the input information to obtain a second category prediction result. The second category prediction result is used as a second category prediction result of the sample target-domain image. A model structure, a model size, and the like of the second category classifier are not limited in embodiments of the present disclosure.

For example, the second category classifier includes an activation function, and the activation function may be any activation function including a Leaky-Softmax function. The activation function determines a similarity between a source-domain image and a first source-domain image corresponding to a sample target-domain image, to obtain probabilities that the sample target-domain image belongs to the category tagging results, namely, second probabilities of the sample target-domain image. In some embodiments, a sum of the probabilities that the sample target-domain image belongs to the category tagging results is greater than or equal to 0 and less than 1.

For any sample target-domain image, the electronic device adds second probabilities of the sample target-domain image, to be specific, adds probabilities that the sample target-domain image belongs to the category tagging results, to obtain a sum of the second probabilities of the sample target-domain image. In some embodiments, the sum of the second probabilities is determined based on the following formula (2).

$$P(X)=\sum_{i=1}^{C_s} f_{C_i}^{Sec} F(x) \qquad \text{Formula (2)}$$

P(X) represents the sum of the second probabilities of the sample target-domain image. $C_s$ represents a quantity of category tagging results.

$$f_{C_i}^{Sec} F(x)$$

represents a probability that the sample target-domain image belongs to an $i^{th}$ category tagging result.

Figure 3:
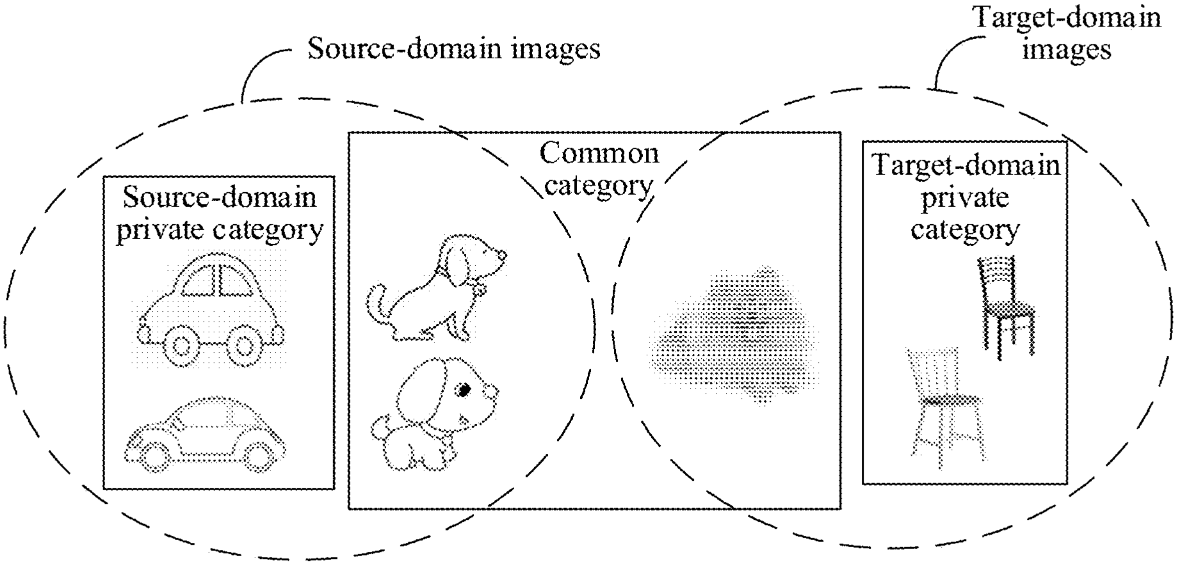
FIG. 3 is a schematic diagram of categories of source-domain images and target-domain images according to an embodiment of the present disclosure.

Three concepts are introduced in embodiments of the present disclosure. FIG. 3 is a schematic diagram of categories of source-domain images and target-domain images according to an embodiment of the present disclosure. A category included in the source-domain images but not included in the target-domain images is referred to as a source-domain private category. A category included in both the source-domain images and the target-domain images is referred to as a common category. A category not included in the source-domain images but included in the target-domain images is referred to as a target-domain private category.

In embodiments of the present disclosure, a sum of second probabilities of a sample target-domain image can directly indicate a probability that the sample target-domain image belongs to the common category, to show a similarity between the sample target-domain image and the source-domain images, and can also indirectly indicate a probability that the sample target-domain image belongs to the target-domain private category. When P(X) is high, a category of the sample target-domain image is more likely to belong to the common category. When P(X) is low, a category of the sample target-domain image is more likely to belong to the target-domain private category.

The electronic device determines a weight coefficient of any sample target-domain image based on a first probability and a sum of second probabilities of the sample target-domain image. For example, the weight coefficient of the sample target-domain image is determined based on the following formula (3).

$$\begin{cases} W^t = P(X)P^{un}(x) \\ P^{un}(x) = 1 - P(y = N + 1 \mid x) \end{cases} \quad \text{Formula (3)}$$

$W^t$ represents the weight coefficient of the sample target-domain image. P(X) represents the sum of the second probabilities of the sample target-domain image. P(y=N+1|x) represents the first probability of the sample target-domain image. $P^{un}(x)$ represents a third probability of the sample target-domain image. N represents a quantity of category tagging results. N+1 herein corresponds to other category tagging results.

In embodiments of the present disclosure, the first probability of the sample target-domain image may indicate a probability that the sample target-domain image belongs to the target-domain private category. Based on the first probability and the sum of the second probabilities of the sample target-domain image, possibilities that the sample target-domain image belongs to the common category and the target-domain private category can be explored, to determine a category of the sample target-domain image.

To make $P^{un}(x)$ small, the first probability that the sample target-domain image belongs to the target-domain private category may be increased through training. To make $P^{un}(x)$ large, the first probability that the sample target-domain image belongs to the target-domain private category may be reduced through training. Usually, a value of $P^{un}(x)$ of a sample target-domain image belonging to the common category is greater than that of a sample target-domain image belonging to the target-domain private category. Therefore, $P^{un}(x)$ is a key parameter that determines whether to increase or reduce the probability that the sample target-domain image belongs to the target-domain private category. The weight coefficient of the sample target-domain image is calculated based on $P^{un}(x)$ and P(X), so that a target-domain image belonging to the common category closer to a source-domain image than a target-domain image belonging to the target-domain private category.

Operation A2: Determine weight coefficients of the sample source-domain images based on the weight coefficients of the sample target-domain images.

In embodiments of the present disclosure, if the category of the sample target-domain image belongs to the target-domain private category, the sum of the second probabilities of the sample target-domain image is approximately equal to 0, and the third probability of the sample target-domain image is also approximately equal to 0. As a result, the weight coefficient of the sample target-domain image is small, and it is more likely determined that the category of the sample target-domain image is the target-domain private category (to be specific, the sample target-domain image belongs to another category). On the contrary, if the category of the sample target-domain image belongs to the common category, the sum of the second probabilities of the sample target-domain image is large, and the third probability of the sample target-domain image is also large. As a result, the weight coefficient of the sample target-domain image is large, and it is more likely determined that the category of the sample target-domain image is the common category (to be specific, the sample target-domain image belongs to any category tagging result).

A target-domain image belonging to the common category is closer to a source-domain image than a target-domain image belonging to the target-domain private category. Therefore, a sample target-domain image (referred to as a reference image below) with a large weight coefficient may be selected, and a weight coefficient of any sample source-domain image may be determined by using the reference image.

In some embodiments, operation A2 includes: determining a plurality of reference images from the sample target-domain images based on the weight coefficients of the sample target-domain images, weight coefficients of the reference images being greater than a weight threshold; and for any sample source-domain image, determining a weight coefficient of the sample source-domain image based on second probabilities that the reference images belong to a category tagging result of the sample source-domain image.

If a weight coefficient of a sample target-domain image is greater than the weight threshold, the sample target-domain image is used as a reference image, and second probabilities that the reference image belongs to categories indicated by the category tagging results are obtained. In this way, a plurality of reference images may be selected from the sample target-domain images, and second probabilities that the reference images belong to the category tagging results may be obtained. A value of the weight threshold is not limited in embodiments of the present disclosure. For example, the weight threshold is a hyperparameter, and may be set to 0.6 or 0.5.

One sample source-domain image corresponds to one category tagging result. Therefore, an operation, such as averaging or summation, may be performed on second probabilities that the reference images belong to a category tagging result of any sample source-domain image, and an operation result is determined as a weight coefficient of the sample source-domain image. For example, the weight coefficient of the sample source-domain image is determined based on the following formula (4).

$$V = avg_{W^t(x_t > w_0)} \hat{y}^t, \; W^s(x_s) = V_{y_s} \quad \text{Formula (4)}$$

V represents a weight coefficient of each category tagging result. avg represents an average value. $W^t(x_t > w_0)$ indicates that a weight coefficient $W^t$ of a sample target-domain image $x_t$ is greater than the weight threshold $w_0$. In this case, the sample target-domain image $x_t$ may be used as a reference image. $\hat{y}^t$ represents a second probability that the reference image belongs to each category tagging result. $W^s(x_s)$ represents a weight coefficient of a sample source-domain image $x_s$. $V_{y_s}$ represents a weight coefficient of a $y_s^{th}$ category tagging result, and the sample source-domain image $x_s$ corresponds to the $y_s^{th}$ category tagging result.

Operation A3: Determine the third loss based on the weight coefficients of the sample target-domain images and the weight coefficients of the sample source-domain images.

The electronic device determines the third loss based on the weight coefficients of the sample target-domain images, the sample target-domain images, the weight coefficients of the sample source-domain images, and the sample source-domain images. Any information obtained by processing the sample target-domain images and the sample source-domain images herein by using the neural network model may be used in calculation of the third loss. For example, the third loss is determined based on the weight coefficients of the sample target-domain images, the image features of the sample target-domain images, the weight coefficients of the sample source-domain images, and the image features of the sample source-domain images.

In some embodiments, operation A3 includes: obtaining domain prediction results of the sample target-domain images and domain prediction results of first target-domain images corresponding to the sample source-domain images; and determining the third loss based on the weight coefficients of the sample target-domain images, the domain prediction results of the sample target-domain images, the weight coefficients of the sample source-domain images, and the domain prediction results of the first target-domain images corresponding to the sample source-domain images.

In embodiments of the present disclosure, the neural network model further includes a domain classifier. The domain classifier is connected in series after the feature extractor, and is configured to: after the feature extractor extracts an image feature of a sample target-domain image, perform domain classification on the sample target-domain image based on the image feature of the sample target-domain image to obtain a domain prediction result of the sample target-domain image. The domain prediction result of the sample target-domain image includes at least one of a probability that the sample target-domain image belongs to the source domain or a probability that the sample target-domain image belongs to the target domain.

In addition, the domain classifier is further connected in series after the first generator, and is configured to: after the first generator generates a first target-domain image corresponding to a sample source-domain image, perform domain classification on the first target-domain image based on the first target-domain image or an image feature of the first target-domain image to obtain a domain prediction result of the first target-domain image. The domain prediction result of the first target-domain image includes at least one of a probability that the first target-domain image belongs to the source domain or a probability that the first target-domain image belongs to the target domain.

Then an operation, such as weighted averaging or weighted summation, is performed on the weight coefficients of the sample target-domain images and the domain prediction results of the sample target-domain images to obtain a first operation result. An operation, such as weighted averaging or weighted summation, is performed on the weight coefficients of the sample source-domain images and the domain prediction results of the first target-domain images corresponding to the sample source-domain images to obtain a second operation result. The third loss is determined based on the first operation result and the second operation result. For example, a sum of the first operation result and the second operation result is used as the third loss, or an average value of the first operation result and the second operation result is used as the third loss.

Operation 2053: Train the neural network model based on the second loss, the third loss, and the first losses of the category tagging results, to obtain the image classification model.

The electronic device adds up the second loss, the third loss, and the first losses of the category tagging results to obtain the loss of the neural network model; or determines the multi-source modal alignment loss based on the first losses of the category tagging results, and adds up the multi-source modal alignment loss, the second loss, and the third loss to obtain the loss of the neural network model. Then the neural network model is trained by using the loss of the neural network model to obtain the image classification model.

In embodiments of the present disclosure, another loss may be further calculated, and the loss of the neural network model is determined based on the calculated loss in combination with the second loss, the third loss, and the first losses of the category tagging results. Several embodiments are provided below: an implementations B1 to an implementation B3.

In the embodiment B1, operation 206 is further included after operation 205.

Operation 206: Determine modal prediction results of the sample source-domain images by using the neural network model, and determine a fourth loss based on the modal prediction results and the modal tagging results of the sample source-domain images.

The neural network model further includes a modal classifier. The modal classifier is connected in series after the feature extractor, and is configured to: after the feature extractor extracts an image feature of a sample source-domain image, perform modal classification on the sample source-domain image based on the image feature of the sample source-domain image to obtain a modal prediction result of the sample source-domain image. Any sample source-domain image corresponds to one modal tagging result. Therefore, a plurality of modal tagging results exist. In embodiments of the present disclosure, the modal prediction result of the sample source-domain image includes probabilities that the sample source-domain image belongs to the modal tagging results.

The electronic device determines the fourth loss based on a fourth loss function by using the modal prediction results and the modal tagging results of the sample source-domain images. For example, the fourth loss function is a relative entropy loss function or a cross entropy loss function. The fourth loss may be determined based on the following formula (5).

$$L^4 = \frac{1}{m}\sum_{i=1}^{m} L^{CE}\left(f_m\left(F\left(D_s^i\right)\right), Y_s\right) \quad \text{Formula (5)}$$

$L^4$ represents the fourth loss. m represents a quantity of sample source-domain images.

$$F\left(D_s^i\right)$$

represents an image feature of an ith sample source-domain image $$D_s^i.\ f_m(\cdot)$$

represents the modal classifier.

$$f_m(F(D_s^i))$$

represents a modal prediction result of the ith sample source-domain image $$D_s^i.\ Y_s$$

represents a modal tagging result of the ith sample source-domain image $$D_s^i.L^{CE}(f_m(F(D_s^i)),\ Y_s)$$

represents a modal loss of the ith sample source-domain image $$D_s^i.$$

On the basis of determining the fourth loss, operation 205 includes: training the neural network model based on the fourth loss, the first losses of the category tagging results, the first category prediction results of the sample source-domain images, and the first category prediction results of the sample target-domain images, to obtain the image classification model.

In some embodiments, the electronic device determines the second loss and the third loss based on the first category prediction results of the sample source-domain images and the first category prediction results of the sample target-domain images; and adds up the second loss, the third loss, the fourth loss, and the first losses of the category tagging results to obtain the loss of the neural network model; or determines the multi-source modal alignment loss based on the first losses of the category tagging results, and adds up the multi-source modal alignment loss, the second loss, the third loss, and the fourth loss to obtain the loss of the neural network model. Then the neural network model is trained by using the loss of the neural network model to obtain the image classification model.

In the embodiment B2, operation 207 is further included after operation 205.

Operation 207: Obtain the domain prediction results of the first target-domain images corresponding to the sample source-domain images and the domain prediction results of the sample target-domain images, and determine a fifth loss based on the domain prediction results of the first target-domain images corresponding to the sample source-domain images and the domain prediction results of the sample target-domain images.

A manner of determining the domain prediction results of the sample target-domain images and the domain prediction results of the first target-domain images corresponding to the sample source-domain images is described in operation A3. Details are not described herein again. The fifth loss may be determined based on a fifth loss function, the domain prediction results of the first target-domain images corresponding to the sample source-domain images, and the domain prediction results of the sample target-domain images.

For example, the electronic device determines a domain loss part of the source domain based on the domain prediction results of the first target-domain images corresponding to the sample source-domain images, and determines a domain loss part of the target domain based on the domain prediction results of the sample target-domain images. The fifth loss is determined based on the domain loss part of the source domain and the domain loss part of the target domain.

In some embodiments, the fifth loss is determined based on the following formula (6).

$$L_{s\to t}^{AGAN} = E_{F(x)\sim D_s}\log[D_Y(G_{s\to t}^A(x))] - E_{F(x)\sim D_t}\log[1 - D_Y(x)] \quad \text{Formula (6)}$$

$$L_{s\to t}^{AGAN}$$

represents the fifth loss.

$$E_{F(x)\sim D_s}\log[D_Y(G_{s\to t}^A(x))]$$

represents the domain loss part corresponding to the source domain. E represents a sign of an average function. log represents a sign for logarithm. $F(x)\sim D_s$ represents an image feature of a sample source-domain image x belonging to the source domain $$D_s.\ D_Y(G_{s\to t}^A(x))$$

represents a domain prediction result of a first target-domain image $$G_{s\to t}^A(x)$$

corresponding to the sample source-domain image. $E_{F(x)\sim D_t}$ $\log[1-D_Y(x)]$ represents the domain loss part corresponding to the target domain. $F(x)\sim D_t$ represents an image feature of a sample target-domain image x belonging to the target domain $D_t$. $D_Y(x)$ represents a domain prediction result of the sample target-domain image.

On the basis of determining the fifth loss, operation 205 includes: training the neural network model based on the fifth loss, the first losses of the category tagging results, the first category prediction results of the sample source-domain images, and the first category prediction results of the sample target-domain images, to obtain the image classification model.

In some embodiments, the electronic device determines the second loss and the third loss based on the first category prediction results of the sample source-domain images and the first category prediction results of the sample target-domain images; and adds up the second loss, the third loss, the fifth loss, and the first losses of the category tagging results to obtain the loss of the neural network model; or determines the multi-source modal alignment loss based on the first losses of the category tagging results, and adds up the multi-source modal alignment loss, the second loss, the third loss, and the fifth loss to obtain the loss of the neural network model. Then the neural network model is trained by using the loss of the neural network model to obtain the image classification model.

For example, in embodiments of the present disclosure, alternatively, domain prediction results of first source-domain images corresponding to the sample target-domain images and domain prediction results of the sample source-domain images may be obtained; and a seventh loss is determined based on the domain prediction results of the first source-domain images corresponding to the sample target-domain images and the domain prediction results of the sample source-domain images. A manner of determining the seventh loss is same to that of determining the fifth loss. Details are not described herein again.

Then the electronic device trains the neural network model based on the seventh loss, the first losses corresponding to the category tagging results, the first category prediction results of the sample source-domain images, and the first category prediction results of the sample target-domain images, to obtain the image classification model. For example, the electronic device determines the second loss and the third loss based on the first category prediction results of the sample source-domain images and the first category prediction results of the sample target-domain images; and adds up the second loss, the third loss, the seventh loss, and the first losses of the category tagging results to obtain the loss of the neural network model; or determines the multi-source modal alignment loss based on the first losses of the category tagging results, and adds up the multi-source modal alignment loss, the second loss, the third loss, and the seventh loss to obtain the loss of the neural network model. Then the neural network model is trained by using the loss of the neural network model to obtain the image classification model.

In the embodiment B3, operation 208 is further included after operation 205.

Operation 208: Generate, based on the first target-domain images corresponding to the sample source-domain images, second source-domain images corresponding to the sample source-domain images; and determine a sixth loss based on the sample source-domain images and the second source-domain images corresponding to the sample source-domain images.

The neural network model further includes a second generator. The second generator is connected in series after the first generator. The second generator is a generator with a built-in attention mechanism, and a direction of the built-in attention mechanism of the second generator is opposite to a direction of the built-in attention mechanism of the first generator. The second generator may learn a mapping relationship between a target-domain image and a source-domain image. Therefore, after the first generator generates a first target-domain image corresponding to a sample source-domain image, the second generator maps, based on the first target-domain image or an image feature of the first target-domain image, the first target-domain image to a second source-domain image corresponding to the sample source-domain image.

The sample source-domain image is an image in the source domain, and the first target-domain image corresponding to the sample source-domain image is an image in the target domain image, but the second source-domain image corresponding to the sample source-domain image is an image in the source domain. Therefore, the first generator and the second generator constitute a loop structure. After a source-domain image is converted into a target-domain image, the target-domain image needs to be converted into a source-domain image again to retain source-domain information and avoid mode crash.

To be specific, for each sample source-domain image in the source domain, the sample source-domain image may be reconstructed by using the first generator and the second generator:

$$x \rightarrow G^{A}_{s\rightarrow t}(x) \rightarrow G^{A}_{t\rightarrow s}\left(G^{A}_{s\rightarrow t}(x)\right) \approx x,$$

where x represents a sample source-domain image, $$G^{A}_{s\rightarrow t}(x)$$

represents a first target-domain image corresponding to the sample source-domain image x, and $$G^{A}_{t\rightarrow s}\left(G^{A}_{s\rightarrow t}(x)\right)$$

represents a second source-domain image corresponding to the sample source-domain image x.

In some embodiments, that the electronic device generates, based on the first target-domain images corresponding to the sample source-domain images, second source-domain images corresponding to the sample source-domain images includes: generating, based an image feature of a first target-domain image corresponding to any sample source-domain image, a source-domain feature and an image content feature of the first target-domain image corresponding to the sample source-domain image; and generating, based on the source-domain feature and the image content feature of the first target-domain image corresponding to the sample source-domain image, a second source-domain image corresponding to the sample source-domain image.

That the second generator generates, based on a first target-domain image corresponding to a sample source-domain image, a second source-domain image corresponding to the sample source-domain image is essentially generating a source-domain image based on a target-domain image. Therefore, for an implementation, refer to the foregoing descriptions of operation 2031. Implementation principles of the two operations are similar. Details are not described herein again.

In some embodiments, the electronic device determines the sixth loss based on a sixth loss function, the sample source-domain images, and the second source-domain images corresponding to the sample source-domain images. The sixth loss function is not limited in embodiments of the present disclosure. For example, a distance (for example, an L1 distance or an L2 distance) between any sample source-domain image and a second source-domain image corresponding to the sample source-domain image is calculated, the distance is used as a distance corresponding to the sample source-domain image, and the sixth loss is determined based on distances corresponding to the sample source-domain images. Alternatively, a similarity (for example, a cosine similarity) between an image feature of any sample source-domain image and an image feature of a second source-domain image corresponding to the sample source-domain image is calculated, the similarity is used as a similarity corresponding to the sample source-domain image, and the sixth loss is determined based on similarities corresponding to the sample source-domain images.

On the basis of determining the sixth loss, operation 205 includes: training the neural network model based on the sixth loss, the first losses of the category tagging results, the first category prediction results of the sample source-domain images, and the first category prediction results of the sample target-domain images, to obtain the image classification model.

In some embodiments, the electronic device determines the second loss and the third loss based on the first category prediction results of the sample source-domain images and the first category prediction results of the sample target-domain images; and adds up the second loss, the third loss, the sixth loss, and the first losses of the category tagging results to obtain the loss of the neural network model; or determines the multi-source modal alignment loss based on the first losses of the category tagging results, and adds up the multi-source modal alignment loss, the second loss, the third loss, and the sixth loss to obtain the loss of the neural network model. Then the neural network model is trained by using the loss of the neural network model to obtain the image classification model.

For example, in embodiments of the present disclosure, alternatively, second target-domain images corresponding to the sample target-domain images may be generated based on first source-domain images corresponding to the sample target-domain images; and an eighth loss is determined based on the sample target-domain images and the second target-domain images corresponding to the sample target-domain images.

After the first generator generates a first source-domain image corresponding to a sample target-domain image, the second generator may map, based on the first source-domain image or an image feature of the first source-domain image, the first source-domain image to a second target-domain image corresponding to the sample target-domain image.

The sample target-domain image is an image in the target domain, and the first source-domain image corresponding to the sample target-domain image is an image in the source domain, but the second target-domain image corresponding to the sample target-domain image is an image in the target domain. Therefore, the first generator and the second generator constitute a loop structure. After a target-domain image is converted into a source-domain image, the source-domain image needs to be converted into a target-domain image again to retain target-domain information and avoid mode crash.

To be specific, for each sample target-domain image in the target domain, the sample target-domain image may be reconstructed by using the first generator and the second generator:

$$x \to G^A_{t\to s}(x) \to G^A_{s\to t}\left(G^A_{t\to s}(x)\right) \approx x,$$

where x represents a sample target-domain image, $$G^A_{t\to s}(x)$$

represents a first source-domain image corresponding to the sample target-domain image x, and $$G^A_{s\to t}\left(G^A_{t\to s}(x)\right)$$

represents a second target-domain image corresponding to the sample target-domain image x.

In some embodiments, that the electronic device generates, based on the first source-domain images corresponding to the sample target-domain images, second target-domain images corresponding to the sample target-domain images includes: generating, based an image feature of a first source-domain image corresponding to any sample target-domain image, a target-domain feature and an image content feature of the first source-domain image corresponding to the sample target-domain image; and generating, based on the target-domain feature and the image content feature of the first source-domain image corresponding to the sample target-domain image, a second target-domain image corresponding to the sample target-domain image.

That the second generator generates, based on a first source-domain image corresponding to a sample target-domain image, a second target-domain image corresponding to the sample target-domain image is essentially generating a target-domain image based on a source-domain image. Therefore, for an implementation, refer to the foregoing descriptions of operation 2021. Implementation principles of the two operations are similar. Details are not described herein again.

In some embodiments, the electronic device determines the eighth loss based on an eighth loss function, the sample target-domain images, and the second target-domain images corresponding to the sample target-domain images. The eighth loss function is not limited in embodiments of the present disclosure. For example, a distance (for example, an L1 distance or an L2 distance) between any sample target-domain image and a second target-domain image corresponding to the sample target-domain image is calculated, the distance is used as a distance corresponding to the sample target-domain image, and the eighth loss is determined based on distances corresponding to the sample target-domain images. Alternatively, a similarity (for example, a cosine similarity) between an image feature of any sample target-domain image and an image feature of a second target-domain image corresponding to the sample target-domain image is calculated, the similarity is used as a similarity corresponding to the sample target-domain image, and the eighth loss is determined based on similarities corresponding to the sample target-domain images.

On the basis of determining the eighth loss, the electronic device trains the neural network model based on the eighth loss, the first losses corresponding to the category tagging results, the first category prediction results of the sample source-domain images, and the first category prediction results of the sample target-domain images, to obtain the image classification model. For example, the electronic device determines the second loss and the third loss based on the first category prediction results of the sample source-domain images and the first category prediction results of the sample target-domain images; and adds up the second loss, the third loss, the eighth loss, and the first losses of the category tagging results to obtain the loss of the neural network model; or determines the multi-source modal alignment loss based on the first losses of the category tagging results, and adds up the multi-source modal alignment loss, the second loss, the third loss, and the eighth loss to obtain the loss of the neural network model. Then the neural network model is trained by using the loss of the neural network model to obtain the image classification model.

In embodiments of the present disclosure, the neural network model may be trained based on at least one of the multi-source modal alignment loss and the second loss to the eighth loss, to obtain an image classification model. In embodiments of the present disclosure, a pre-trained residual network may be used as the feature extractor. In addition, during pre-training, initial learning rates of network layers in the feature extractor other than the last two network layers are set to $10^{-6}$, initial learning rates of the last two network layers in the feature extractor are set to $10^{-5}$, and a learning rate attenuation rate is set to 0.5 per 1000 steps. A neural network model is built by using the pre-trained feature extractor, and the neural network model is trained. In this case, an optimizer (for example, an Adam optimizer) may be configured for training. Two hyperparameters of the optimizer are beta1=0.5 and beta2=0.999, and a weight attenuation is 0.0001. During adjustment of a model parameter of the neural network model, adjustment may be performed based on a hyperparameter $\lambda$=0.1, and the neural network model is trained 10,000 times in total. If the neural network model converges early, the training is stopped.

During each time of training, a quantity of sample source-domain images and a quantity of sample target-domain images are 256 in total. Data enhancement may be performed on at least one of the sample source-domain image or the sample target-domain image. For example, affine transformation is performed on the sample target-domain image to increase a quantity of images.

Information (including but not limited to user equipment information, personal information of a user, and the like), data (including but not limited to data for analysis, stored data, displayed data, and the like), and signals in the present disclosure are used under authorization by users or full authorization by all parties. In addition, collection, use, and processing of related data need to comply with related laws, regulations, and standards in related countries and regions. For example, the sample source-domain images and the sample target-domain images in the present disclosure are obtained under full authorization.

In the foregoing method, for any category tagging result, image features of two sample source-domain images with a same category tagging result and different modal tagging results are used as a source-domain image feature pair corresponding to the category tagging result. This facilitates comparison between the image features of the two sample source-domain images with the same category tagging result and different modal tagging results. A first loss corresponding to the category tagging result is determined by using source-domain image feature pairs corresponding to the category tagging result, to obtain an image classification model through training by using the first loss corresponding to the category tagging result. In this way, the image classification model can draw image features of every two sample source-domain images with a same category tagging result and different modal tagging results close, so that the sample source-domain images with the same category tagging result and different modal tagging results have similar image features, and the image features focus more on category distinguishing and weaken modal distinguishing. Therefore, image features extracted by the image classification model are more conducive to image classification, so that accuracy of a classification result is improved.

Figure 4:
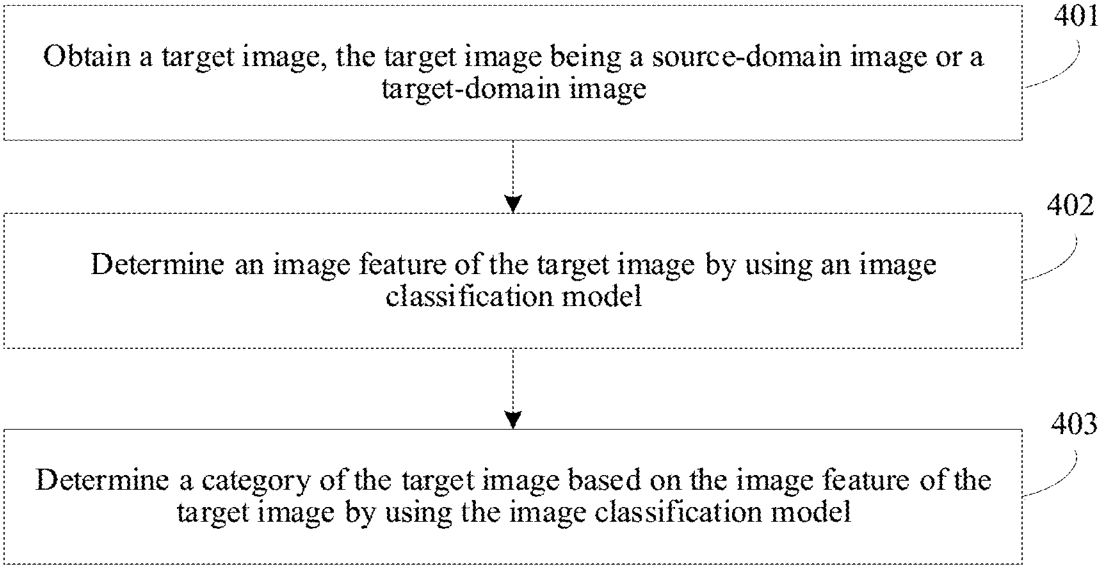
FIG. 4 is a flowchart of an image classification method according to an embodiment of the present disclosure.

Embodiments of the present disclosure further provide an image classification method. The method may be applied to the foregoing implementation environment. A flowchart of an image classification method according to an embodiment of the present disclosure in FIG. 4 is used as an example. The method may be performed by the terminal device 101 or the server 102 in FIG. 1, or may be performed by both the terminal device 101 and the server 102. For ease of description, the terminal device 101 or the server 102 for performing the image classification method in embodiments of the present disclosure is referred to as an electronic device. The method may be performed by the electronic device. As shown in FIG. 4, the method includes the following operations:

Operation 401: Obtain a candidate image to be classified, the candidate image being a source-domain image or a target-domain image.

The candidate image may be an image in a source domain (namely, a source-domain image) or an image in a target domain (namely, a target-domain image). A manner of obtaining the candidate image is not limited in embodiments of the present disclosure. For example, the electronic device may receive a candidate image transmitted by another device or manually input, or the electronic device may obtain a candidate image through photographing.

Operation 402: Determine an image feature of the candidate image by using an image classification model.

The image classification model is trained according to the method for training an image classification model related to FIG. 2.

The image classification model includes a feature extractor. The feature extractor is configured to perform feature extraction on the candidate image to obtain the image feature of the candidate image. For a manner of determining the image feature of the candidate image, refer to the foregoing descriptions related to an image feature of a sample source-domain image. Implementation principles of the two manners are similar. Details are not described herein again.

Operation 403: Determine a category of the candidate image based on the image feature of the candidate image by using the image classification model.

In embodiments of the present disclosure, a category prediction result of the candidate image may be determined based on the image feature of the candidate image by using the image classification model. For a process of determining the category prediction result of the candidate image, refer to the descriptions of operation 202 and operation 203. Implementation principles of the two processes are similar. Details are not described herein again.

Then the category of the candidate image is determined based on the category prediction result of the candidate image. In some embodiments, the category prediction result of the candidate image includes probabilities that the candidate image belongs to category tagging results. If a probability that the candidate image belongs to any category tagging result is greater than or equal to a reference probability, it is determined that the category of the candidate image is the category tagging result.

A value of the reference probability is not limited in embodiments of the present disclosure. For example, the reference probability is a highest one of the probabilities that the candidate image belongs to the category tagging results.

Alternatively, the probabilities that the candidate image belongs to the category tagging results is sorted, and a probability in a specified position after the sorting is used as the reference probability. Alternatively, the reference probability is specified data.

In some embodiments, the category prediction result of the candidate image includes the probabilities that the candidate image belongs to the category tagging results and a probability that the candidate image belongs to a category tagging result other than the category tagging results. If a probability that the candidate image belongs to any category tagging result is greater than or equal to a reference probability, it is determined that the category of the candidate image is the category tagging result.

In one embodiment, operation 403 includes operation 4031 and operation 4032.

Operation 4031: When the candidate image is a source-domain image, generate, based on an image feature of the source-domain image by using the image classification model, a target-domain image corresponding to the source-domain image; and determine a category of the source-domain image based on the target-domain image corresponding to the source-domain image by using the image classification model.

In embodiments of the present disclosure, the category prediction result of the source-domain image is determined based on the target-domain image corresponding to the source-domain image, and then the category of the source-domain image is determined based on the category prediction result of the source-domain image. For content of determining the category prediction result of the source-domain image, refer to the descriptions of operation 2021 and operation 2022. Both processes are processes of determining a category prediction result of an image in the source domain, and implementation principles thereof are the same. Details are not described herein again.

In some embodiments, the generating, based on an image feature of the source-domain image by using the image classification model, a target-domain image corresponding to the source-domain image in operation 4031 includes: generating, based on the image feature of the source-domain image by using the image classification model, a target-domain feature and an image content feature of the source-domain image; and generating, based on the target-domain feature and the image content feature of the source-domain image by using the image classification model, the target-domain image corresponding to the source-domain image.

For a process of generating the target-domain image corresponding to the source-domain image, refer to the descriptions of operation 2021. Operation 2021 includes a process of generating a first target-domain image corresponding to a sample source-domain image. Implementation principles of the two processes are the same. Details are not described herein again.

Operation 4032: When the candidate image is a target-domain image, generate, based on an image feature of the target-domain image by using the image classification model, a source-domain image corresponding to the target-domain image; and determine a category of the target-domain image based on the source-domain image corresponding to the target-domain image by using the image classification model.

In embodiments of the present disclosure, the category prediction result of the target-domain image is determined based on the source-domain image corresponding to the target-domain image, and then the category of the target-domain image is determined based on the category prediction result of the target-domain image. For content of determining the category prediction result of the target-domain image, refer to the descriptions of operation 2031 and operation 2032. Both processes are processes of determining a category prediction result of an image in the target domain, and implementation principles thereof are the same. Details are not described herein again.

In some embodiments, the generating, based on an image feature of the target-domain image by using the image classification model, a source-domain image corresponding to the target-domain image in operation 4032 includes: generating, based on the image feature of the target-domain image by using the image classification model, a source-domain feature and an image content feature of the target-domain image; and generating, based on the source-domain feature and the image content feature of the target-domain image by using the image classification model, the source-domain image corresponding to the target-domain image.

For a process of generating the source-domain image corresponding to the target-domain image, refer to the descriptions of operation 2031. Operation 2031 includes a process of generating a first source-domain image corresponding to a sample target-domain image. Implementation principles of the two processes are the same. Details are not described herein again.

Information (including but not limited to user equipment information, personal information of a user, and the like), data (including but not limited to data for analysis, stored data, displayed data, and the like), and signals in the present disclosure are used under authorization by users or full authorization by all parties. In addition, collection, use, and processing of related data need to comply with related laws, regulations, and standards in related countries and regions. For example, the candidate image in the present disclosure is obtained under full authorization.

The image features extracted by the image classification model in the foregoing method are more conducive to image classification. Therefore, classification accuracy is high in the case of classification for the candidate image by using the image classification model. In addition, the image classification model may be applied to various classification scenarios. For example, image classification is performed on medical images to achieve objectives of diagnosing diseases, analyzing lesion types, and the like.

The foregoing describes the method for training an image classification model and the image classification method provided in embodiments of the present disclosure from a perspective of method operations. The following systematically describes a process of training an image classification model provided in embodiments of the present disclosure. Refer to FIG. 5. (1) in FIG. 5 is a diagram of a framework for training an image classification model according to an embodiment of the present disclosure.

In embodiments of the present disclosure, a neural network model is trained by using a sample source-domain image and a sample target-domain image to obtain an image classification model. The neural network model includes a feature extractor, a modal classifier, a domain classifier, a first generator, a second generator, a first category classifier, a second category classifier, and a discriminator. The feature extractor is configured to extract an image feature of the sample source-domain image and an image feature of the sample target-domain image. The image feature of the sample source-domain image may be configured for determining first losses of category tagging results, to determine a multi-source modal alignment loss.

The image feature of the sample source-domain image may be further input to the first generator. The first generator generates, based on the image feature of the sample source-domain image, a first target-domain image corresponding to the sample source-domain image. The first target-domain image may be input to the first category classifier. The first category classifier determines a first category prediction result of the sample source-domain image, the first category prediction result of the sample source-domain image being configured for determining a second loss together with a category tagging result of the sample source-domain image.

The first target-domain image corresponding to the sample source-domain image may be further input to the second category classifier. The second category classifier determines a second category prediction result of the sample source-domain image. The first category prediction result and the second category prediction result are input to the discriminator. The discriminator generates a weight coefficient of the sample target-domain image, and determines a weight coefficient of the sample source-domain image based on the weight coefficient of the sample target-domain image. The image feature of the sample target-domain image may be input to the domain classifier, and the domain classifier outputs a domain prediction result of the sample target-domain image. In addition, the first target-domain image may also be input to the domain classifier, and the domain classifier outputs a domain prediction result of the first target-domain image. The weight coefficient of the sample target-domain image, the domain prediction result of the sample target-domain image, the weight coefficient of the sample source-domain image, and the domain prediction result of the first target-domain image are configured for determining a third loss.

The image feature of the source-domain image is input to the modal classifier, and the modal classifier is configured to perform modal classification on the source-domain image to obtain a modal prediction result of the source-domain image. The modal prediction result of the source-domain image is configured for determining a fourth loss together with a modal tagging result of the source-domain image.

The domain prediction result of the first target-domain image and the domain prediction result of the sample target-domain image are further configured for determining a fifth loss.

The first target-domain image may be further input to the second generator, and the second generator generates a second source-domain image corresponding to the sample source-domain image. The sample source-domain image and the second source-domain image are configured for determining a sixth loss.

Then the multi-source modal alignment loss and the second loss to the sixth loss may be added up to obtain a loss of the neural network model. The neural network model is trained by using the loss of the neural network model to obtain an image classification model.

The weight coefficient of the sample target-domain image may be configured for adjusting the first category classifier. (2) in FIG. 5 is a schematic diagram of impact of a weight coefficient of a sample target-domain image on a category according to an embodiment of the present disclosure. In embodiments of the present disclosure, a sample target-domain image is input to a feature extractor, and the feature extractor extracts an image feature of the sample target-domain image. A first category classifier may determine a first category prediction result of the sample target-domain image based on the image feature of the sample target-domain image. A discriminator may determine a weight coefficient of the sample target-domain image based on the image feature of the sample target-domain image. The weight coefficient of the sample target-domain image needs to be determined based on the first category prediction result of the sample target-domain image.

When the weight coefficient of the sample target-domain image is less than a weight threshold, it may be determined, based on the first category prediction result of the sample target-domain image, that the sample target-domain image probably belongs to a target-domain private category. When the weight coefficient of the sample target-domain image is not less than the weight threshold, it may be determined, based on the first category prediction result of the sample target-domain image, that the sample target-domain image probably belongs to a common category.

After an image classification model is obtained through training, the image classification model may be configured for classification for a candidate image. FIG. 6 is a schematic diagram of image classification according to an embodiment of the present disclosure. In embodiments of the present disclosure, the image classification model in embodiments of the present disclosure is configured at a back end. The back end may receive a candidate image that is input from a front end A, perform category classification on the candidate image, and output a category of the candidate image to a front end B. In some embodiments, both the front end A and the front end B are terminal devices, and the back end is a server.

In some embodiments, the image classification model configured at the back end may be a model that remains after at least one of a modal classifier, a domain classifier, a second generator, a second category classifier, and a discriminator is removed. This reduces a computing amount and a storage amount at the back end.

In embodiments of the present disclosure, five sample datasets may be obtained. None of the sample datasets has priori knowledge of category overlapping between source-domain images and target-domain images, and whether a category of a source-domain image has a plurality of modalities is not sure either. The five sample datasets are denoted as a dataset 1 to a dataset 5. The dataset 1 has a total of 31 categories and includes three domains, and any domain may serve as a source domain or a target domain. The dataset 2 has a total of 65 categories and includes four domains, and any domain may serve as a source domain or a target domain. The dataset 3 has a total of 12 categories and includes two domains, and any domain may serve as a source domain or a target domain. The dataset 4 has a total of 256 categories and includes 1000 domains, and any domain may serve as a source domain or a target domain. The dataset 5 has a total of 345 categories and includes six domains, and any domain may serve as a source domain or a target domain.

In embodiments of the present disclosure, accuracy of 18 models in the dataset 1, the dataset 2, and the dataset 5 is tested. The 18 models are denoted as M1 to M18. M1 to M17 are image classification models in the related art, and M18 is the image classification model in embodiments of the present disclosure. An optimizer parameter for training M2 and M3 is as follows: $\beta$=0.32. An optimizer parameter for training M4 to M6 is as follows: $\beta$=0.15. An optimizer parameter for training M7 and M8 is as follows: $\beta$=0.5. An optimizer parameter for training M9 to M14 is as follows: $\beta$=0.07. An optimizer parameter for training M15 to M17 is as follows: $\beta$=0.43. The foregoing five optimizer parameters are denoted as i, ii, iii, iv, and v in sequence. Any two of the three domains in the dataset 1 are combined to obtain D1 to D3. Any two of the four domains in the dataset 2 are combined to obtain D1 to D4. Any two of the six domains in the dataset 5 are combined to obtain D1 to D6. Data shown in Table 1 may be counted based on the foregoing content. E representing an average value.

reason is as follows: The dataset 3 has only two domains, the dataset 1 and the dataset 2 each have more domains than the dataset 3, and the dataset 5 has more domains than the dataset 1 and the dataset 2. Therefore, it can be learned that performance of the image classification model in embodiments of the present disclosure is similar to that of the image classification models in the related art when a few domains exist, and in a dataset with a large quantity of domains, the image classification model in embodiments of the present disclosure can improve classification accuracy.

TABLE 1

| | | Dataset 1 | | | | Dataset 2 | | | | | Dataset 3 | | | | | | |
|---|---|---|---|---|---|---|---|---|---|---|---|---|---|---|---|---|---|
| | Model | D1 | D2 | D3 | E | D1 | D2 | D3 | D4 | E | D1 | D2 | D3 | D4 | D5 | D6 | E |
| | M1 | 73.21 | 82.24 | 76.21 | 77.22 | 53.17 | 72.16 | 81.24 | 63.24 | 67.57 | 51.16 | 43.25 | 51.54 | 52.16 | 48.76 | 46.29 | 48.86 |
| i | M2 | 71.24 | 76.24 | 78.27 | 75.25 | 53.23 | 70.24 | 78.23 | 61.85 | 65.89 | 53.54 | 46.26 | 55.36 | 54.25 | 50.11 | 47.28 | 51.13 |
| | M3 | 72.12 | 76.53 | 77.68 | 75.44 | 54.65 | 69.16 | 77.21 | 65.54 | 66.39 | 55.65 | 48.92 | 55.20 | 55.78 | 51.42 | 48.31 | 52.55 |
| ii | M4 | 73.26 | 77.16 | 77.45 | 75.96 | 57.28 | 69.82 | 78.34 | 65.56 | 67.68 | 56.23 | 49.52 | 54.89 | 54.22 | 52.58 | 49.29 | 52.79 |
| | M5 | 73.53 | 78.15 | 77.97 | 76.49 | 58.34 | 70.25 | 78.18 | 66.53 | 68.33 | 57.52 | 50.17 | 55.29 | 56.18 | 51.25 | 50.12 | 53.42 |
| | M6 | 74.23 | 77.79 | 77.56 | 76.53 | 78.15 | 69.93 | 79.23 | 67.14 | 68.61 | 58.05 | 51.73 | 56.71 | 57.54 | 52.85 | 51.35 | 54.71 |
| iii | M7 | 75.14 | 76.13 | 80.11 | 77.13 | 58.06 | 70.53 | 78.24 | 67.15 | 68.50 | 59.28 | 49.71 | 55.23 | 58.21 | 51.63 | 52.18 | 54.40 |
| | M8 | 74.27 | 76.81 | 78.25 | 76.44 | 58.14 | 68.22 | 75.12 | 70.12 | 67.90 | 58.54 | 50.12 | 54.97 | 58.03 | 50.64 | 51.76 | 54.01 |
| iv | M9 | 84.13 | 85.24 | 80.61 | 83.33 | 64.25 | 76.24 | 84.76 | 76.41 | 75.42 | 65.07 | 60.43 | 64.63 | 67.85 | 60.22 | 61.34 | 63.26 |
| | M10 | 83.78 | 84.17 | 79.14 | 82.36 | 64.11 | 75.63 | 84.15 | 74.98 | 74.72 | 62.46 | 61.58 | 61.33 | 66.23 | 58.98 | 62.54 | 62.19 |
| | M11 | 85.14 | 85.20 | 80.81 | 83.72 | 65.08 | 76.23 | 81.97 | 76.49 | 74.94 | 61.95 | 62.36 | 62.16 | 67.81 | 60.17 | 63.11 | 62.93 |
| | M12 | 83.16 | 82.18 | 79.32 | 81.55 | 64.34 | 74.65 | 83.62 | 77.93 | 75.14 | 62.18 | 63.02 | 63.56 | 66.81 | 61.12 | 65.63 | 63.72 |
| | M13 | 86.93 | 86.78 | 81.36 | 85.02 | 65.84 | 77.07 | 85.13 | 78.13 | 76.54 | 65.28 | 66.42 | 62.15 | 67.51 | 62.38 | 67.03 | 65.13 |
| | M14 | 85.98 | 86.29 | 84.34 | 85.54 | 67.94 | 78.27 | 86.12 | 79.41 | 77.94 | 66.09 | 68.26 | 64.17 | 70.24 | 64.51 | 68.37 | 66.94 |
| v | M15 | 72.31 | 78.65 | 75.97 | 75.64 | 60.11 | 70.08 | 80.41 | 64.18 | 68.70 | 60.12 | 50.65 | 55.31 | 60.24 | 50.73 | 52.16 | 54.87 |
| | M16 | 74.63 | 76.92 | 76.87 | 76.14 | 61.59 | 70.32 | 77.13 | 65.83 | 68.72 | 59.62 | 51.22 | 52.88 | 62.45 | 50.14 | 50.84 | 54.53 |
| | M17 | 70.14 | 69.22 | 66.17 | 68.51 | 65.62 | 73.45 | 62.43 | 62.77 | 66.07 | 54.38 | 50.12 | 51.28 | 58.64 | 43.87 | 50.12 | 51.40 |
| | M18 | 90.12 | 87.12 | 86.29 | 87.74 | 87.28 | 81.97 | 90.11 | 82.12 | 82.12 | 70.08 | 71.58 | 68.29 | 72.52 | 67.46 | 70.24 | 70.03 |

The data in Table 1 represents accuracy of the image classification models. It can be learned from Table 1 that data corresponding to M18 is greater than data corresponding to M1 to M17. Therefore, accuracy of the image classification model in embodiments of the present disclosure is higher.

In embodiments of the present disclosure, classification accuracy of 10 models, namely, M1 to M4, M6 to M8, M12, M13, and M18, in a dataset 1, a dataset 2, a dataset 3, and a dataset 5 is further tested. Any two of three domains in the dataset 1 are combined to obtain D1 to D3. Any two of four domains in the dataset 2 are combined to obtain D1 to D6. Two domains in the dataset 3 are combined to obtain D1 and D2. Any two of six domains in the dataset 5 are combined to obtain D1 to D3. Data shown in Table 2 may be counted based on the foregoing content.

In embodiments of the present disclosure, an image classification model obtained through training in the manner shown in FIG. 5 is denoted as a model 1. In addition, an image classification model obtained through training based on the training process shown in FIG. 5 after the modal classifier is removed is denoted as a model 2; an image classification model obtained through training based on the training process shown in FIG. 5 after the first generator and the second generator are removed is denoted as a model 3; and an image classification model obtained through training based on the training process shown in FIG. 5 after the second category classifier and the discriminator are removed is denoted as a model 4.

TABLE 2

| | | Dataset 1 | | | | Dataset 2 | | | | | | | Dataset 3 | | Dataset 5 | | | |
|---|---|---|---|---|---|---|---|---|---|---|---|---|---|---|---|---|---|---|
| | Model | D1 | D2 | D3 | E | D1 | D2 | D3 | D4 | D5 | D6 | E | D1 | D2 | D1 | D2 | D3 | E |
| | M1 | 75.94 | 89.60 | 80.45 | 82.00 | 59.37 | 76.58 | 87.48 | 69.86 | 71.11 | 81.66 | 74.34 | 52.80 | 70.28 | 58.23 | 49.65 | 52.68 | 53.52 |
| i | M2 | 80.65 | 80.94 | 88.07 | 83.22 | 56.17 | 81.72 | 86.87 | 68.67 | 73.38 | 83.76 | 75.10 | 52.94 | 71.37 | 55.31 | 49.19 | 54.38 | 52.96 |
| | M3 | 75.24 | 73.81 | 78.58 | 75.88 | 52.63 | 78.32 | 77.87 | 70.23 | 72.45 | 84.21 | 72.62 | 53.28 | 72.81 | 53.21 | 42.27 | 49.67 | 48.38 |
| ii | M4 | 77.13 | 80.76 | 75.54 | 77.81 | 67.24 | 63.62 | 77.86 | 66.80 | 63.26 | 75.83 | 69.10 | 37.69 | 65.82 | 54.12 | 47.63 | 50.79 | 50.85 |
| | M6 | 78.52 | 84.33 | 78.15 | 80.33 | 69.55 | 67.53 | 80.06 | 69.52 | 70.67 | 77.25 | 72.43 | 39.78 | 66.98 | 55.25 | 48.25 | 56.13 | 53.21 |
| iii | M7 | 86.82 | 98.14 | 87.25 | 90.74 | 56.16 | 79.18 | 81.53 | 75.65 | 71.86 | 87.08 | 75.24 | 60.21 | 74.96 | 62.13 | 54.47 | 58.25 | 58.28 |
| | M8 | 87.94 | 97.62 | 88.47 | 91.34 | 54.29 | 78.82 | 79.93 | 73.07 | 72.54 | 85.45 | 74.02 | 59.08 | 73.24 | 59.97 | 53.64 | 57.28 | 56.96 |
| iv | M12 | 81.37 | 98.28 | 87.82 | 88.49 | 61.74 | 81.97 | 84.82 | 74.84 | 77.29 | 85.68 | 77.27 | 65.76 | 79.21 | 60.21 | 54.48 | 59.30 | 58.00 |
| | M13 | 87.98 | 96.88 | 88.25 | 91.04 | 65.29 | 83.63 | 89.62 | 82.41 | 79.26 | 87.76 | 81.33 | 75.25 | 86.14 | 65.63 | 61.41 | 67.20 | 64.75 |
| | M18 | 88.14 | 95.13 | 89.16 | 90.81 | 66.15 | 84.12 | 89.87 | 84.12 | 78.29 | 85.13 | 81.28 | 71.42 | 84.36 | 68.24 | 63.04 | 68.08 | 66.45 |

The data in Table 2 represent classification accuracy of the image classification models. It can be learned from Table 2 that classification accuracy of M18 is higher than that of M1 to M4, M6 to M8, and M12. In the dataset 3, classification accuracy of M13 is higher than that of M18. In the dataset 1 and the dataset 2, a difference between classification accuracy of M18 and that of M13 is small. In the dataset 5, classification accuracy of M18 is higher than that of M13. A Performance of the model 1 to the model 4 in the dataset 1, the dataset 2, and the dataset 5 is tested. Any two of three domains in the dataset 1 are combined to obtain D1. Any two of four domains in the dataset 2 are combined to obtain D1 to D3. Any two of six domains in the dataset 5 are combined to obtain D1. Data shown in Table 3 may be counted based on the foregoing content.

TABLE 3

| Model | Dataset 1 D1 | Dataset 2 D1 | Dataset 2 D2 | Dataset 2 D3 | Dataset 5 D1 |
|---|---|---|---|---|---|
| Model 2 | 86.53 | 71.94 | 78.41 | 83.45 | 67.99 |
| Model 3 | 86.13 | 68.12 | 74.11 | 82.76 | 68.32 |
| Model 4 | 85.28 | 66.29 | 74.56 | 85.67 | 61.24 |
| Model 1 | 90.12 | 74.28 | 81.97 | 90.11 | 70.08 |

The data in Table 3 represents performance of the image classification models. It can be learned from Table 3 that performance of the model 1 is higher than that of the model 2, the model 3, and the model 4. Therefore, an image classification model obtained through training based on the training process shown in FIG. 5 has higher classification performance.

Figure 7:
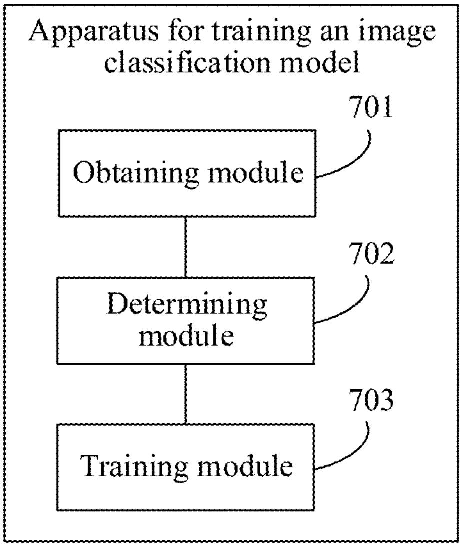
FIG. 7 is a schematic structural diagram of an apparatus for training an image classification model according to an embodiment of the present disclosure.

FIG. 7 is a schematic structural diagram of an apparatus for training an image classification model according to an embodiment of the present disclosure. As shown in FIG. 7, the apparatus includes:

- an obtaining module 701, configured to obtain a plurality of sample source-domain images, a plurality of sample target-domain images, modal tagging results of the sample source-domain images, and category tagging results of the sample source-domain images;
- a determining module 702, configured to determine first category prediction results of the sample source-domain images by using a neural network model,
- the determining module 702 being further configured to determine first category prediction results of the sample target-domain images by using the neural network model; and
- the determining module 702 being further configured to: for any category tagging result, determine a first loss of the category tagging result based on source-domain image feature pairs corresponding to the category tagging result, a source-domain image feature pair corresponding to the category tagging result including image features of two sample source-domain images, the two sample source-domain images having the category tagging result, and modal tagging results of the two sample source-domain images being different; and
- a training module 703, configured to train the neural network model based on first losses of category tagging results, the first category prediction results of the sample source-domain images, and the first category prediction results of the sample target-domain images, to obtain an image classification model.

In one embodiment, the determining module 702 is configured to: for any sample source-domain image, generate, based on an image feature of the sample source-domain image by using the neural network model, a first target-domain image corresponding to the sample source-domain image; and determine the first category prediction result of the sample source-domain image based on the first target-domain image corresponding to the sample source-domain image by using the neural network model.

In one embodiment, the determining module 702 is configured to: generate a target-domain feature and an image content feature of the sample source-domain image based on the image feature of the sample source-domain image; and generate, based on the target-domain feature and the image content feature of the sample source-domain image, the first target-domain image corresponding to the sample source-domain image.

In one embodiment, the determining module 702 is configured to: for any sample target-domain image, generate, based on an image feature of the sample target-domain image by using the neural network model, a first source-domain image corresponding to the sample target-domain image; and determine the first category prediction result of the sample target-domain image based on the first source-domain image corresponding to the sample target-domain image by using the neural network model.

In one embodiment, the training module 703 is configured to: determine a second loss based configured to on the first category prediction results of the sample source-domain images and the category tagging results of the sample source-domain images; determine a third loss based on the first category prediction results of the sample target-domain images; and train the neural network model based on the second loss, the third loss, and the first losses of the category tagging results, to obtain the image classification model.

In one embodiment, the training module 703 is configured to: determine weight coefficients of the sample target-domain images based on the first category prediction results of the sample target-domain images; determine weight coefficients of the sample source-domain images based on the weight coefficients of the sample target-domain images; and determine the third loss based on the weight coefficients of the sample target-domain images and the weight coefficients of the sample source-domain images.

In one embodiment, a first category prediction result of any sample target-domain image includes a first probability of the sample target-domain image, and the first probability of the sample target-domain image is a probability that the sample target-domain image belongs to a category other than categories in the category tagging results; and

- the training module 703 is configured to: obtain second category prediction results of the sample target-domain images, the second category prediction result of the sample target-domain image including a second probability of the sample target-domain image, and the second probability of the sample target-domain image being a probability that the sample target-domain image belongs to one of the categories in the category tagging results; and for any sample target-domain image, determine a weight coefficient of the sample target-domain image based on a first probability and a second probability of the sample target-domain image.

In one embodiment, the training module 703 is configured to: determine a plurality of reference images from the sample target-domain images based on the weight coefficients of the sample target-domain images, weight coefficients of the reference images being greater than a weight threshold; and for any sample source-domain image, determining a weight coefficient of the sample source-domain image based on second probabilities of the reference images, the second probability of the reference image being a probability that the reference image belongs to a category tagging result of the sample source-domain image.

In one embodiment, the training module 703 is configured to: obtain domain prediction results of the sample target-domain images and domain prediction results of first target-domain images corresponding to the sample source-domain images; and determine the third loss based on the weight coefficients of the sample target-domain images, the domain prediction results of the sample target-domain images, the weight coefficients of the sample source-domain images, and the domain prediction results of the first target-domain images corresponding to the sample source-domain images.

In one embodiment, the apparatus further includes:

the determining module 702 is further configured to: determine modal prediction results of the sample source-domain images by using the neural network model; and determine a fourth loss based on the modal prediction results and the modal tagging results of the sample source-domain images; and the training module 703 is configured to train the neural network model based on the fourth loss, the first losses of the category tagging results, the first category prediction results of the sample source-domain images, and the first category prediction results of the sample target-domain images, to obtain the image classification model.

In one embodiment, the apparatus further includes:

the determining module 702 is further configured to: obtain the domain prediction results of the first target-domain images corresponding to the sample source-domain images and the domain prediction results of the sample target-domain images; and determine a fifth loss based on the domain prediction results of the first target-domain images corresponding to the sample source-domain images and the domain prediction results of the sample target-domain images; and the training module 703 is configured to train the neural network model based on the fifth loss, the first losses of the category tagging results, the first category prediction results of the sample source-domain images, and the first category prediction results of the sample target-domain images, to obtain the image classification model.

In one embodiment, the apparatus further includes:

the determining module 702 is further configured to: obtain domain prediction results of first source-domain images corresponding to the sample target-domain images and domain prediction results of the sample source-domain images; and determine a seventh loss based on the domain prediction results of the first source-domain images corresponding to the sample target-domain images and the domain prediction results of the sample source-domain images; and the training module 703 is configured to train the neural network model based on the seventh loss, the first losses of the category tagging results, the first category prediction results of the sample source-domain images, and the first category prediction results of the sample target-domain images, to obtain the image classification model.

In one embodiment, the apparatus further includes:

the determining module 702 is further configured to: generate, based on the first target-domain images corresponding to the sample source-domain images, second source-domain images corresponding to the sample source-domain images; and determine a sixth loss based on the sample source-domain images and the second source-domain images corresponding to the sample source-domain images; and the training module 703 is configured to train the neural network model based on the sixth loss, the first losses of the category tagging results, the first category prediction results of the sample source-domain images, and the first category prediction results of the sample target-domain images, to obtain the image classification model.

In one embodiment, the determining module 702 is configured to: for any sample source-domain image, generate, based on an image feature of a first target-domain image corresponding to the sample source-domain image, a source-domain feature and an image content feature of the first target-domain image corresponding to the sample source-domain image; and generate, based on the source-domain feature and the image content feature of the first target-domain image corresponding to the sample source-domain image, a second source-domain image corresponding to the sample source-domain image.

In one embodiment, the apparatus further includes:

the determining module 702 is further configured to: generate, based on the first source-domain images corresponding to the sample target-domain images, second target-domain images corresponding to the sample target-domain images; and determine an eighth loss based on the sample target-domain images and the second target-domain images corresponding to the sample target-domain images; and the training module 703 is configured to train the neural network model based on the eighth loss, the first losses of the category tagging results, the first category prediction results of the sample source-domain images, and the first category prediction results of the sample target-domain images, to obtain the image classification model.

In one embodiment, the determining module 702 is configured to: for any sample target-domain image, generate, based on an image feature of a first source-domain image corresponding to the sample target-domain image, a target-domain feature and an image content feature of the first source-domain image corresponding to the sample target-domain image; and generate, based on the target-domain feature and the image content feature of the first source-domain image corresponding to the sample target-domain image, a second target-domain image corresponding to the sample target-domain image.

In the foregoing apparatus, for any category tagging result, image features of two sample source-domain images with a same category tagging result and different modal tagging results are used as a source-domain image feature pair corresponding to the category tagging result. This facilitates comparison between the image features of the two sample source-domain images with the same category tagging result and different modal tagging results. A first loss corresponding to the category tagging result is determined by using source-domain image feature pairs corresponding to the category tagging result, to obtain an image classification model through training by using the first loss corresponding to the category tagging result. In this way, the image classification model can draw image features of every two sample source-domain images with a same category tagging result and different modal tagging results close, so that the sample source-domain images with the same category tagging result and different modal tagging results have similar image features, and the image features focus more on category distinguishing and weaken modal distinguishing. Therefore, image features extracted by the image classification model are more conducive to image classification, so that accuracy of a classification result is improved.

When the apparatus provided in FIG. 7 implements functions of the apparatus, the division of the foregoing functional modules is merely used as an example for description. In practical application, the functions may be allocated to and completed by different functional modules according to requirements. To be specific, an internal structure of a device is divided into different functional modules to complete all or some of the functions described above. In addition, the apparatus provided in the foregoing embodiment and the method embodiments belong to a same concept. For details about a specific implementation process of the apparatus, refer to the method embodiments. Details are not described herein again.

Figure 8:
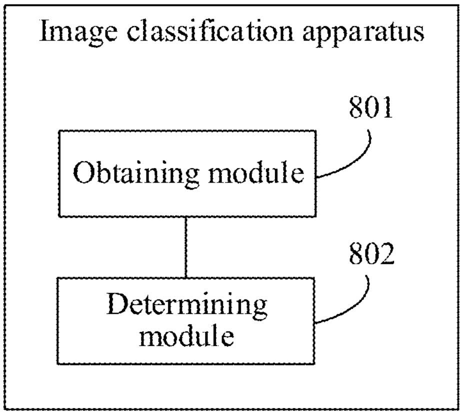
FIG. 8 is a schematic structural diagram of an image classification apparatus according to an embodiment of the present disclosure.

FIG. 8 is a schematic structural diagram of an image classification apparatus according to an embodiment of the present disclosure. As shown in FIG. 8, the apparatus includes:

an obtaining module 801, configured to obtain a candidate image, the candidate image being a source-domain image or a target-domain image; and a determining module 802, configured to determine an image feature of the candidate image by using an image classification model, the image classification model being obtained through training according to the method for training an image classification model in any one of the foregoing embodiments, and the determining module 802 being further configured to determine a category of the candidate image based on the image feature of the candidate image by using the image classification model.

In one embodiment, the determining module 802 is configured to: when the candidate image is a source-domain image, generate, based on an image feature of the source-domain image by using the image classification model, a target-domain image corresponding to the source-domain image; and determine a category of the source-domain image based on the target-domain image corresponding to the source-domain image by using the image classification model; or when the candidate image is a target-domain image, generate, based on an image feature of the target-domain image by using the image classification model, a source-domain image corresponding to the target-domain image; and determine a category of the target-domain image based on the source-domain image corresponding to the target-domain image by using the image classification model.

In one embodiment, the determining module 802 is configured to: generate, based on the image feature of the source-domain image by using the image classification model, a target-domain feature and an image content feature of the source-domain image; and generate, based on the target-domain feature and the image content feature of the source-domain image by using the image classification model, the target-domain image corresponding to the source-domain image; and the determining module 802 is configured to: generate, based on the image feature of the target-domain image by using the image classification model, a source-domain feature and an image content feature of the target-domain image; and generate, based on the source-domain feature and the image content feature of the target-domain image by using the image classification model, the source-domain image corresponding to the target-domain image.

The image features extracted by the image classification model in the foregoing apparatus are more conducive to image classification. Therefore, classification accuracy is high in the case of classification for the candidate image by using the image classification model.

When the apparatus provided in FIG. 8 implements functions of the apparatus, the division of the foregoing functional modules is merely used as an example for description. In practical application, the functions may be allocated to and completed by different functional modules according to requirements. To be specific, an internal structure of a device is divided into different functional modules to complete all or some of the functions described above. The module may refer to a software module, a hardware module, or a combination thereof. Each module can be implemented using one or more processors (or processors and memory). Likewise, a processor (or processors and memory) can be used to implement one or more modules. In addition, the apparatus provided in the foregoing embodiment and the method embodiments belong to a same concept. For details about a specific implementation process of the apparatus, refer to the method embodiments. Details are not described herein again.

In an exemplary embodiment, an electronic device is further provided. The electronic device includes a processor and a memory. The memory stores at least one computer program. The at least one computer program is loaded and executed by the processor, so that the electronic device implements the method for training an image classification model or the image classification method in any one of the foregoing embodiments.

Figure 9:
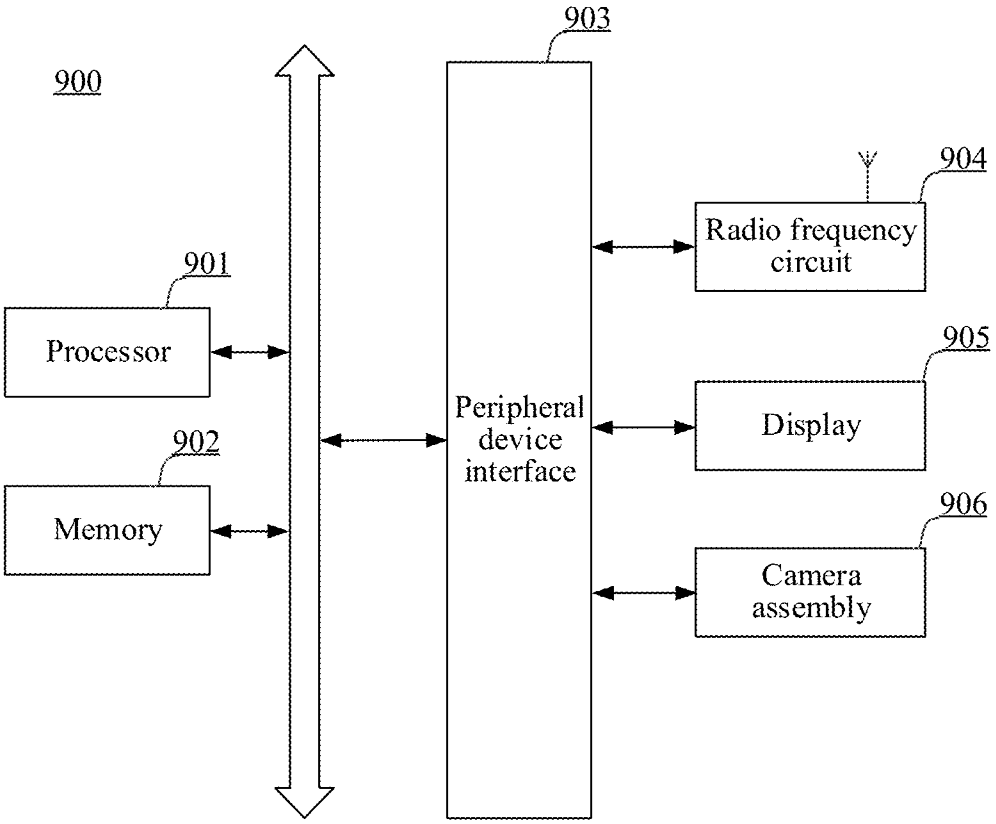
FIG. 9 is a schematic structural diagram of a terminal device according to an embodiment of the present disclosure.

In some embodiments, the electronic device is a terminal device. FIG. 9 is a structural block diagram of a terminal device 900 according to an exemplary embodiment of the present disclosure. The terminal device 900 includes a processor 901 and a memory 902.

The processor 901 may include one or more processing cores, for example, a 4-core processor or an 8-core processor. The processor 901 may be implemented in at least one hardware form of a digital signal processor (DSP), a field programmable gate array (FPGA), and a programmable logic array (PLA). The processor 901 may also include a main processor and a coprocessor. The main processor is a processor configured to process data in an awake state, and is also referred to as a central processing unit (CPU). The coprocessor is a low-power processor configured to process data in a standby state. In some embodiments, the processor 901 may be integrated with a graphics processing unit (GPU). The GPU is configured to render and draw content that needs to be displayed on a display screen. In some embodiments, the processor 901 may further include an AI processor. The AI processor is configured to process computing operations related to machine learning.

The memory 902 may include one or more computer-readable storage media. The computer-readable storage medium may be non-transient. The memory 902 may further include a high-speed random access memory and a nonvolatile memory, for example, one or more disk storage devices or flash storage devices. In some embodiments, the non-transient computer-readable storage medium in the memory 902 is configured to store at least one computer program, and the at least one computer program is executed by the processor 901 to implement the method for training an image classification model and the image classification method in the method embodiments of the present disclosure.

In some embodiments, the terminal device 900 further includes a peripheral device interface 903 and at least one peripheral device. The processor 901, the memory 902, and the peripheral device interface 903 may be connected through a bus or a signal cable. Each peripheral device may be connected to the peripheral device interface 903 through a bus, a signal cable, or a circuit board. Specifically, the peripheral device includes at least one of a radio frequency (RF) circuit 904, a display screen 905, or a camera assembly 906.

The peripheral interface 903 may be configured to connect the at least one peripheral related to input/output (I/O) to the processor 901 and the memory 902. In some embodiments, the processor 901, the memory 902, and the peripheral device interface 903 are integrated on one chip or circuit board. In some other embodiments, any one or two of the processor 901, the memory 902, and the peripheral device interface 903 may be implemented on a separate chip or circuit board. This is not limited in this embodiment.

The RF circuit 904 is configured to receive and transmit an RF signal, also referred to as an electromagnetic signal. The RF circuit 904 communicates with a communication network and other communication devices through the electromagnetic signal. The RF circuit 904 converts an electrical signal into an electromagnetic signal for transmission, or converts a received electromagnetic signal into an electrical signal. In some embodiments, the RF circuit 904 includes an antenna system, an RF transceiver, one or more amplifiers, a tuner, an oscillator, a digital signal processor, a codec chip set, a subscriber identity module card, and the like.

The display screen 905 is configured to display a user interface (UI). The UI may include a graph, text, an icon, a video, and any combination thereof. When the display screen 905 is a touch display screen, the display screen 905 further has a capability of capturing a touch signal on or above a surface of the display screen 905. The touch signal may be input to the processor 901 as a control signal for processing. In this case, the display screen 905 may be further configured to provide a virtual button and/or a virtual keyboard, also referred to as a soft button and/or a soft keyboard.

The camera assembly 906 is configured to capture images or videos. In some embodiments, the camera assembly 906 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions.

A person skilled in the art may understand that the structure shown in FIG. 9 constitutes no limitation on the terminal device 900, and the terminal device may include more or fewer components than those shown in the figure, or some components may be combined, or a different component layout may be used.

Figure 10:
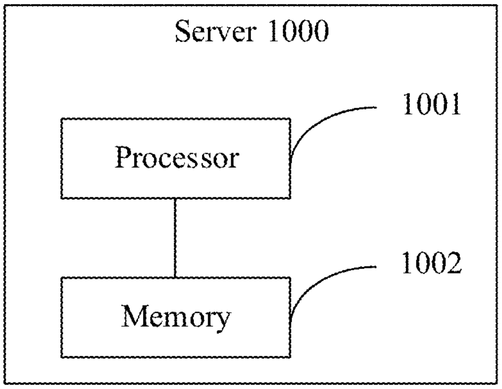
FIG. 10 is a schematic structural diagram of a server according to an embodiment of the present disclosure.

In some embodiments, the electronic device is a server. FIG. 10 is a schematic structural diagram of a server according to an embodiment of the present disclosure. The server 1000 may vary greatly due to different configurations or performance, and may include one or more processors 1001 and one or more memories 1002. The one or more memories 1002 store at least one instruction. The at least one instruction is loaded and executed by the one or more processors 1001 to implement the method for training an image classification model or the image classification method in the foregoing method embodiments. For example, the processor 1001 is a CPU. Certainly, the server 1000 may further include components such as a wired or wireless network interface, a keyboard, and an input/output interface, to facilitate input and output. The server 1000 may further include another component configured to implement a function of a device. Details are not described herein.

In an exemplary embodiment, a computer-readable storage medium is further provided. The storage medium stores at least one computer program. The at least one computer program is loaded and executed by a processor, so that an electronic device implements the method for training an image classification model or the image classification method in any one of the foregoing embodiments.

In some embodiments, the computer-readable storage medium may be a read-only memory (ROM), a random access memory (RAM), a compact disc read-only memory (CD-ROM), a magnetic tape, a floppy disk, an optical data storage device, or the like.

In an exemplary embodiment, a computer program or computer program product is further provided. The computer program or computer program product stores at least one computer program. The at least one computer program is loaded and executed by a processor, so that an electronic device implements the method for training an image classification model or the image classification method in any one of the foregoing embodiments.

The "plurality" mentioned in this specification means two or more. "And/or" describes an association relationship between associated objects and indicates that three relationships may exist. For example, A and/or B may indicate the following three cases: Only A exists, both A and B exist, and only B exists. The character "/" usually indicates an "or" relationship between the associated objects.

The sequence numbers of the foregoing embodiments of the present disclosure are merely for description purpose but do not imply the preference among the embodiments.

The foregoing descriptions are merely exemplary embodiments of the present disclosure, but are not intended to limit the present disclosure. Any modification, equivalent replacement, or improvement made within the principle of the present disclosure shall fall within the protection scope of the present disclosure.

What is claimed is:

1. A method for training an image classification model, performed by an electronic device, the method comprising:

obtaining a plurality of sample source-domain images, a plurality of sample target-domain images, modal tagging results of the sample source-domain images, and category tagging results of the sample source-domain images;

determining first category prediction results of the sample source-domain images by using a neural network model;

determining first category prediction results of the sample target-domain images by using the neural network model;

for a category tagging result from the category tagging results of the sample source-domain images, determining a first loss of the category tagging result based on source-domain image feature pairs corresponding to the category tagging result, a source-domain image feature pair corresponding to the category tagging result comprising image features of two sample source-domain images, the two sample source-domain images having the same category tagging result, and modal tagging results of the two sample source-domain images being different; and training the neural network model based on first losses of category tagging results, the first category prediction results of the sample source-domain images, and the first category prediction results of the sample target-domain images, to obtain an image classification model.

2. The method according to claim 1, wherein the determining first category prediction results of the sample source-domain images by using a neural network model comprises:
for a sample source-domain image, generating, based on an image feature of the sample source-domain image by using the neural network model, a first target-domain image corresponding to the sample source-domain image; and
determining the first category prediction result of the sample source-domain image based on the first target-domain image corresponding to the sample source-domain image by using the neural network model.

3. The method according to claim 2, wherein the generating, based on an image feature of the sample source-domain image, a first target-domain image corresponding to the sample source-domain image comprises:
generating a target-domain feature and an image content feature of the sample source-domain image based on the image feature of the sample source-domain image; and
generating, based on the target-domain feature and the image content feature of the sample source-domain image, the first target-domain image corresponding to the sample source-domain image.

4. The method according to claim 1, wherein the training the neural network model based on first losses of category tagging results, the first category prediction results of the sample source-domain images, and the first category prediction results of the sample target-domain images, to obtain an image classification model comprises:
determining a second loss based on the first category prediction results of the sample source-domain images and the category tagging results of the sample source-domain images;
determining a third loss based on the first category prediction results of the sample target-domain images; and
training the neural network model based on the second loss, the third loss, and the first losses of the category tagging results, to obtain the image classification model.

5. The method according to claim 4, wherein the determining a third loss based on the first category prediction results of the sample target-domain images comprises:
determining weight coefficients of the sample target-domain images based on the first category prediction results of the sample target-domain images;
determining weight coefficients of the sample source-domain images based on the weight coefficients of the sample target-domain images; and
determining the third loss based on the weight coefficients of the sample target-domain images and the weight coefficients of the sample source-domain images.

6. The method according to claim 5, wherein a first category prediction result of a sample target-domain image comprises a first probability of the sample target-domain image that the sample target-domain image belongs to a category other than categories in the category tagging results; and
the determining weight coefficients of the sample target-domain images based on the first category prediction results of the sample target-domain images comprises:
obtaining second category prediction results of the sample target-domain images, the second category prediction result of the sample target-domain image comprising a second probability of the sample target-domain image that the sample target-domain image belongs to one of the categories in the category tagging results; and
for a sample target-domain image, determining a weight coefficient of the sample target-domain image based on a first probability and a second probability of the sample target-domain image.

7. The method according to claim 5, wherein the determining weight coefficients of the sample source-domain images based on the weight coefficients of the sample target-domain images comprises:
determining a plurality of reference images from the sample target-domain images based on the weight coefficients of the sample target-domain images, weight coefficients of the reference images being greater than a weight threshold; and
for a sample source-domain image, determining a weight coefficient of the sample source-domain image based on second probabilities of the reference images that the reference image belongs to a category indicated by a category tagging result of the sample source-domain image.

8. The method according to claim 5, wherein the determining the third loss based on the weight coefficients of the sample target-domain images and the weight coefficients of the sample source-domain images comprises:
obtaining domain prediction results of the sample target-domain images and domain prediction results of first target-domain images corresponding to the sample source-domain images; and
determining the third loss based on the weight coefficients of the sample target-domain images, the domain prediction results of the sample target-domain images, the weight coefficients of the sample source-domain images, and the domain prediction results of the first target-domain images corresponding to the sample source-domain images.

9. The method according to claim 1, wherein the method further comprises:
determining modal prediction results of the sample source-domain images by using the neural network model;
determining a fourth loss based on the modal prediction results and the modal tagging results of the sample source-domain images; and
the training the neural network model based on first losses of category tagging results, the first category prediction results of the sample source-domain images, and the first category prediction results of the sample target-domain images, to obtain an image classification model comprises:
training the neural network model based on the fourth loss, the first losses of the category tagging results, the first category prediction results of the sample source-domain images, and the first category prediction results of the sample target-domain images, to obtain the image classification model.

10. The method according to claim 1, wherein the method further comprises: obtaining domain prediction results of the first target-domain images corresponding to the sample source-domain images and domain prediction results of the sample target-domain images; and determining a fifth loss based on the domain prediction results of the first target-domain images corresponding to the sample source-domain images and the domain prediction results of the sample target-domain images; and the training the neural network model based on first losses of category tagging results, the first category prediction results of the sample source-domain images, and the first category prediction results of the sample target-domain images, to obtain an image classification model comprises: training the neural network model based on the fifth loss, the first losses of the category tagging results, the first category prediction results of the sample source-domain images, and the first category prediction results of the sample target-domain images, to obtain the image classification model.

11. The method according to claim 1, wherein the method further comprises:

obtaining domain prediction results of first source-domain images corresponding to the sample target-domain images and domain prediction results of the sample source-domain images; and determining a seventh loss based on the domain prediction results of the first source-domain images corresponding to the sample target-domain images and the domain prediction results of the sample source-domain images; and the training the neural network model based on first losses of category tagging results, the first category prediction results of the sample source-domain images, and the first category prediction results of the sample target-domain images, to obtain an image classification model comprises:

training the neural network model based on the seventh loss, the first losses of the category tagging results, the first category prediction results of the sample source-domain images, and the first category prediction results of the sample target-domain images, to obtain the image classification model.

12. The method according to claim 1, wherein the method further comprises:

generating, based on the first target-domain images corresponding to the sample source-domain images, second source-domain images corresponding to the sample source-domain images; and determining a sixth loss based on the sample source-domain images and the second source-domain images corresponding to the sample source-domain images; and the training the neural network model based on first losses of category tagging results, the first category prediction results of the sample source-domain images, and the first category prediction results of the sample target-domain images, to obtain an image classification model comprises:

training the neural network model based on the sixth loss, the first losses of the category tagging results, the first category prediction results of the sample source-domain images, and the first category prediction results of the sample target-domain images, to obtain the image classification model.

13. The method according to claim 12, wherein the generating, based on the first target-domain images corresponding to the sample source-domain images, second source-domain images corresponding to the sample source-domain images comprises:

for a sample source-domain image, generating, based on an image feature of a first target-domain image corresponding to the sample source-domain image, a source-domain feature and an image content feature of the first target-domain image corresponding to the sample source-domain image; and generating, based on the source-domain feature and the image content feature of the first target-domain image corresponding to the sample source-domain image, a second source-domain image corresponding to the sample source-domain image.

14. The method according to claim 1, wherein the method further comprises:

generating, based on the first source-domain images corresponding to the sample target-domain images, second target-domain images corresponding to the sample target-domain images; and determining an eighth loss based on the sample target-domain images and the second target-domain images corresponding to the sample target-domain images; and the training the neural network model based on first losses of category tagging results, the first category prediction results of the sample source-domain images, and the first category prediction results of the sample target-domain images, to obtain an image classification model comprises:

training the neural network model based on the eighth loss, the first losses of the category tagging results, the first category prediction results of the sample source-domain images, and the first category prediction results of the sample target-domain images, to obtain the image classification model.

15. The method according to claim 14, wherein the generating, based on the first source-domain images corresponding to the sample target-domain images, second target-domain images corresponding to the sample target-domain images comprises:

for a sample target-domain image, generating, based on an image feature of a first source-domain image corresponding to the sample target-domain image, a target-domain feature and an image content feature of the first source-domain image corresponding to the sample target-domain image; and generating, based on the target-domain feature and the image content feature of the first source-domain image corresponding to the sample target-domain image, a second target-domain image corresponding to the sample target-domain image.

16. An apparatus for training an image classification model, configured in an electronic device, the apparatus comprising:

at least one processor and at least one memory, the memory storing at least one computer program, and the at least one computer program being loaded and executed by the at least one processor to perform:

obtaining a plurality of sample source-domain images, a plurality of sample target-domain images, modal tagging results of the sample source-domain images, and category tagging results of the sample source-domain images;

determining first category prediction results of the sample source-domain images by using a neural network model;

determining first category prediction results of the sample target-domain images by using the neural network model;

for a category tagging result from the category tagging results of the sample source-domain images, determining a first loss of the category tagging result based on source-domain image feature pairs corresponding to the category tagging result, a source-domain image feature pair corresponding to the category tagging result comprising image features of two sample source-domain images, the two sample source-domain images having the same category tagging result, and modal tagging results of the two sample source-domain images being different; and training the neural network model based on first losses of category tagging results, the first category prediction results of the sample source-domain images, and the first category prediction results of the sample target-domain images, to obtain an image classification model.

17. The apparatus according to claim 16, wherein the determining first category prediction results of the sample source-domain images by using a neural network model comprises:

for a sample source-domain image, generating, based on an image feature of the sample source-domain image by using the neural network model, a first target-domain image corresponding to the sample source-domain image; and determining the first category prediction result of the sample source-domain image based on the first target-domain image corresponding to the sample source-domain image by using the neural network model.

18. The apparatus according to claim 17, wherein the generating, based on an image feature of the sample source-domain image, a first target-domain image corresponding to the sample source-domain image comprises:

generating a target-domain feature and an image content feature of the sample source-domain image based on the image feature of the sample source-domain image; and generating, based on the target-domain feature and the image content feature of the sample source-domain image, the first target-domain image corresponding to the sample source-domain image.

19. The apparatus according to claim 16, wherein the training the neural network model based on first losses of category tagging results, the first category prediction results of the sample source-domain images, and the first category prediction results of the sample target-domain images, to obtain an image classification model comprises:

determining a second loss based on the first category prediction results of the sample source-domain images and the category tagging results of the sample source-domain images;

determining a third loss based on the first category prediction results of the sample target-domain images; and training the neural network model based on the second loss, the third loss, and the first losses of the category tagging results, to obtain the image classification model.

20. A non-transitory computer-readable storage medium, the computer-readable storage medium storing at least one computer program, and when being loaded and executed by at least one processor, the at least one computer program causes the at least one processor to perform:

obtaining a plurality of sample source-domain images, a plurality of sample target-domain images, modal tagging results of the sample source-domain images, and category tagging results of the sample source-domain images;

determining first category prediction results of the sample source-domain images by using a neural network model;

determining first category prediction results of the sample target-domain images by using the neural network model;

for a category tagging result from the category tagging results of the sample source-domain images, determining a first loss of the category tagging result based on source-domain image feature pairs corresponding to the category tagging result, a source-domain image feature pair corresponding to the category tagging result comprising image features of two sample source-domain images, the two sample source-domain images having the same category tagging result, and modal tagging results of the two sample source-domain images being different; and training the neural network model based on first losses of category tagging results, the first category prediction results of the sample source-domain images, and the first category prediction results of the sample target-domain images, to obtain an image classification model.

* * * * *